(12) United States Patent
Han

(10) Patent No.: US 10,394,297 B1
(45) Date of Patent: Aug. 27, 2019

(54) CHANGING STATION FOR WEARABLE COMPUTER BAND

(71) Applicant: Joseph Sung Han, Plano, TX (US)

(72) Inventor: Joseph Sung Han, Plano, TX (US)

(*) Notice: Subject to any disclaimer, the term of this patent is extended or adjusted under 35 U.S.C. 154(b) by 229 days.

(21) Appl. No.: 15/189,946

(22) Filed: Jun. 22, 2016

Related U.S. Application Data

(60) Provisional application No. 62/231,018, filed on Jun. 22, 2015.

(51) Int. Cl.
| | |
|---|---|
| *G04D 1/06* | (2006.01) |
| *G06F 1/16* | (2006.01) |
| *A47B 81/00* | (2006.01) |
| *A47B 97/00* | (2006.01) |
| *G06F 1/26* | (2006.01) |

(52) U.S. Cl.
CPC .............. *G06F 1/263* (2013.01); *A47B 81/00* (2013.01); *A47B 97/00* (2013.01); *G04D 1/06* (2013.01); *G06F 1/163* (2013.01); *A47B 2097/006* (2013.01)

(58) Field of Classification Search
CPC ... A47B 81/00; A47B 97/00; A47B 2097/006; G04B 37/0083; G04B 37/14; G04B 37/1486; G04D 1/06; G06F 1/06; G06F 1/163; G06F 1/263
USPC ....... 248/114, 115, 116, 121, 127, 317, 442; 206/6.1; 211/26, 85.2; 368/281, 282; D9/415, 422
See application file for complete search history.

(56) References Cited

U.S. PATENT DOCUMENTS

| | | | | |
|---|---|---|---|---|
| 1,613,492 A | * | 1/1927 | Thompson | B60R 1/12 211/89.01 |
| 2,549,369 A | * | 4/1951 | Epstein | A47F 7/022 248/116 |
| 3,312,435 A | * | 4/1967 | Malone | A47F 7/022 211/69 |
| 4,034,849 A | * | 7/1977 | Zakrajsek | A45C 11/10 206/301 |
| 4,082,183 A | * | 4/1978 | Sturm | A45C 11/10 206/301 |
| 4,094,409 A | * | 6/1978 | Spranger | A47F 7/022 206/301 |
| 4,216,858 A | * | 8/1980 | Beauchamp | A45C 11/10 206/301 |
| 4,293,943 A | * | 10/1981 | Avery | G04B 37/1473 248/116 |
| 4,830,181 A | * | 5/1989 | Hartman | A45C 11/10 206/301 |
| 5,383,552 A | * | 1/1995 | Dikowitz | A45C 11/10 206/301 |

(Continued)

*Primary Examiner* — Joshua E Rodden
(74) *Attorney, Agent, or Firm* — Jeffrey Roddy; Robert Wise

(57) ABSTRACT

A band-changing station for changing the band of a wearable electronic device includes a station adapted to receive the electronic display portion of a wearable device and the band portion of a wearable electronic device. The station includes a track configured to accept the electronic portion of the wearable electronic device and a mechanism to couple or decouple the electronic display to and from the band portion. A receiver for the electronic portion may be adapted to transition into and out of alignment with one or more bands for coupling or decoupling purposes.

4 Claims, 20 Drawing Sheets

(56) References Cited

U.S. PATENT DOCUMENTS

| | | | |
|---|---|---|---|
| 6,341,751 B1* | 1/2002 | Herzog | A47F 7/022 206/301 |
| 10,043,357 B2* | 8/2018 | Hartweg | A47F 7/022 |
| 2015/0227114 A1* | 8/2015 | Perrinjaquet | A47F 7/022 248/116 |

* cited by examiner

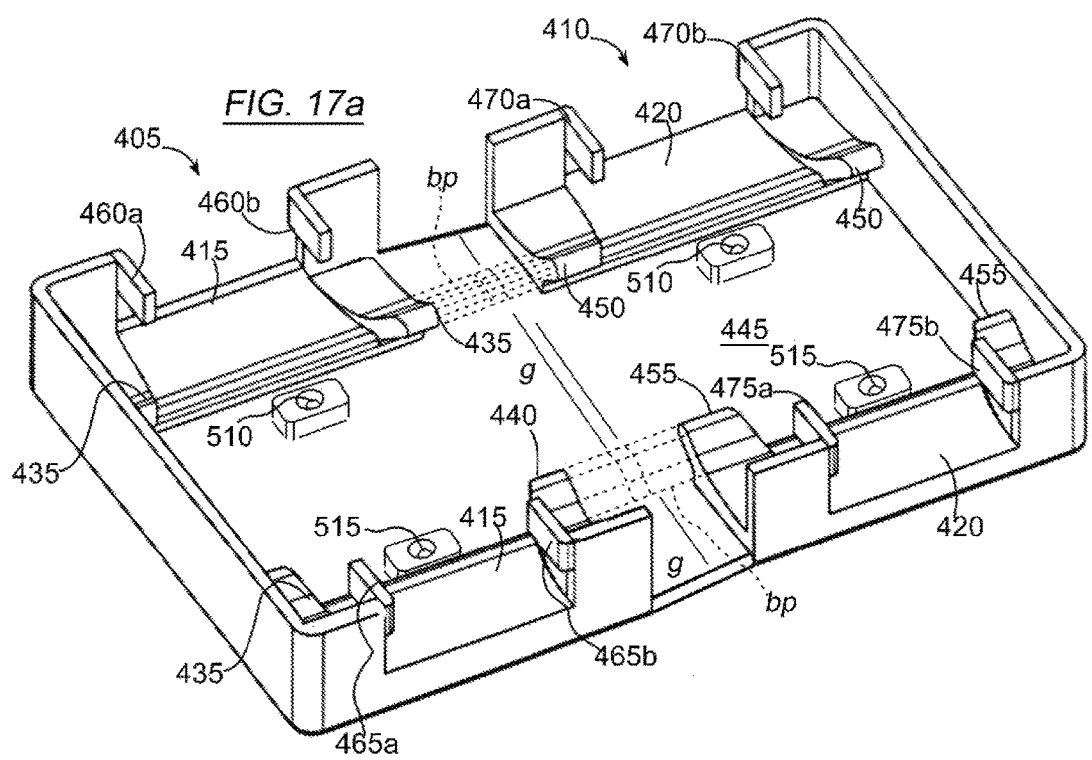

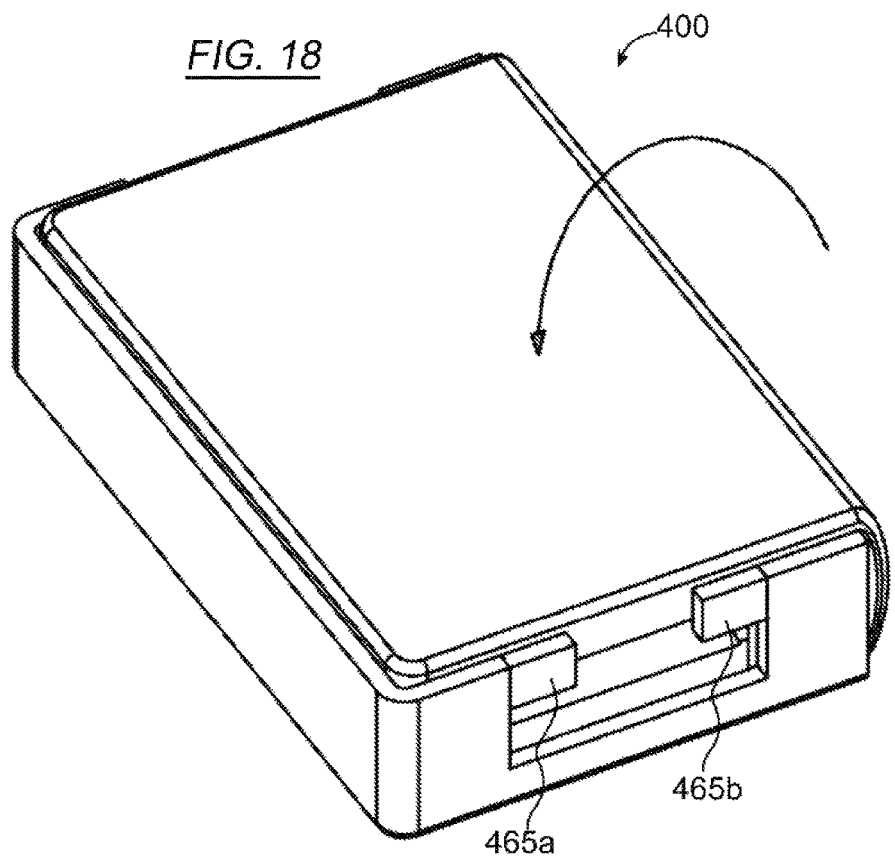
FIG. 18
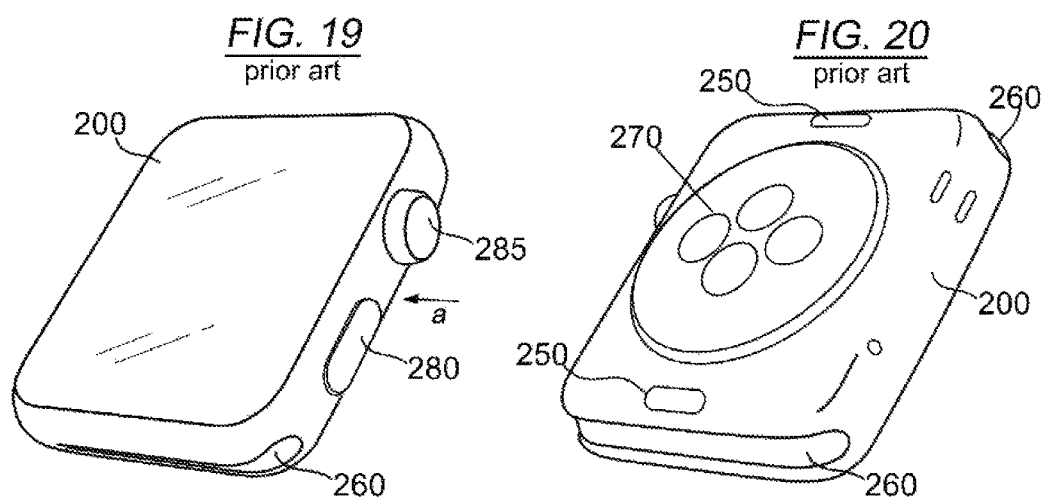
FIG. 19
prior art
FIG. 20
prior art

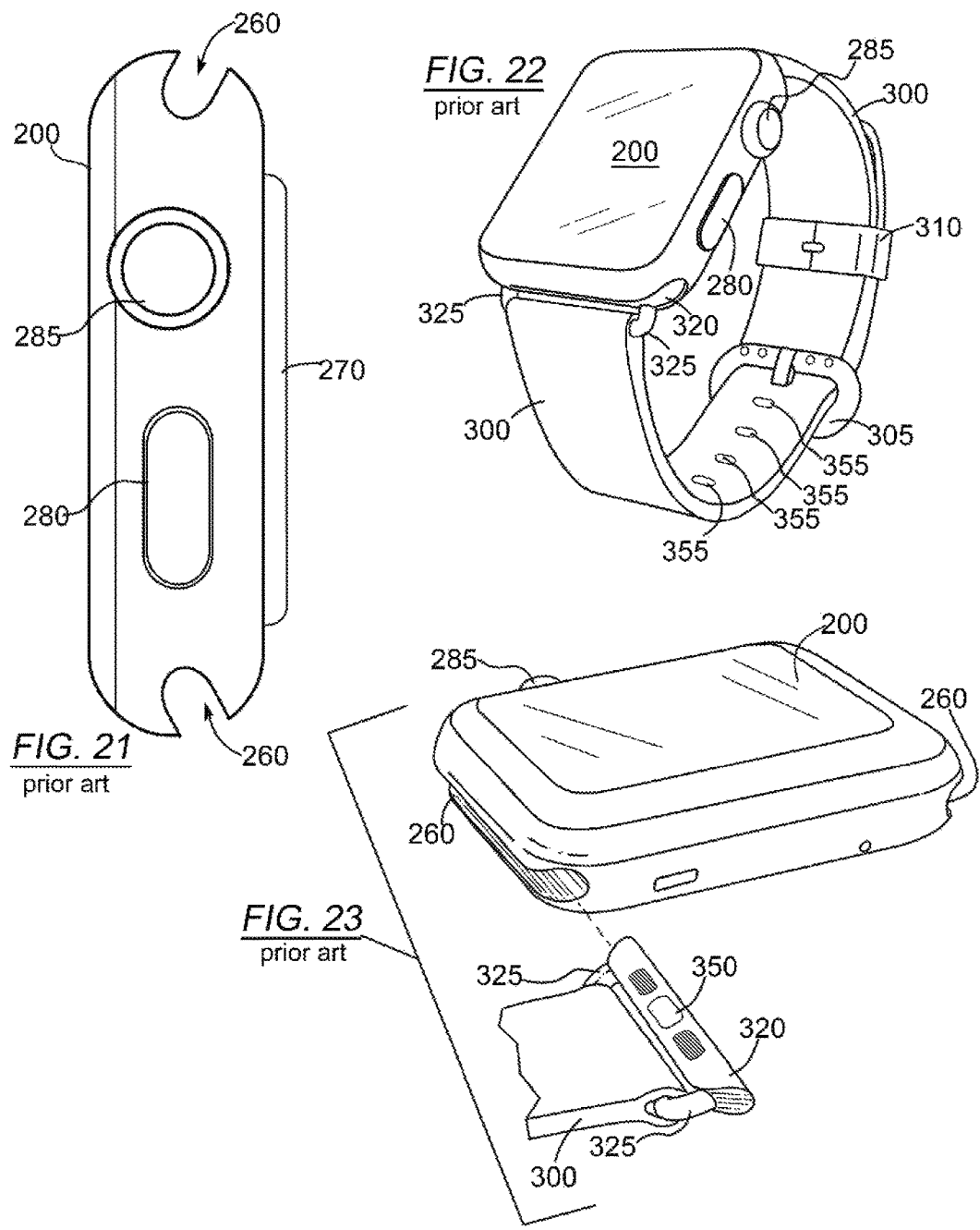

CHANGING STATION FOR WEARABLE COMPUTER BAND

CROSS-REFERENCE TO RELATED APPLICATIONS

This application claims the benefit of the provisional patent application No. 62/231,018 of the same title and filed Jun. 22, 2015.

BACKGROUND OF THE INVENTION

A wearable computer is an electronic device that is arranged to be worn by a person. These devices are also called body-borne computers. They may comprise an electronic device that may include one or more of a computer, computer controllers or input devices, an information receiving and/or sending device, sensors, microphones, speakers, Bluetooth capability, and information displays. Other functional features may be included. The electronic device may also include a band that is connected to the electronic device and which can secures the electronic device to a part of a person's body, typically the part of the forearm near the wrist. The band can be independent and be designed to secure the electronic device to the body over or under the person's clothing, or the band may cooperate or be integrated into the clothing that a person wears.

Watch bands are commonly known and used. In that art, a watch "band" is a generic term for anything that holds a watch onto the forearm of a person, usually near to the person's wrist. A "bracelet" is a metal-link watch band, or a solid band of metal that somehow pivots to open; it is similar to a jewelry bracelet and is typically opened and closed by a clasp. A "strap" is a watch band made of some non-metal material, such as leather, plastic, cloth, rubber, or the like. In this application, I use the term "band" for a something that holds a wearable computer in the same sense that it is used for a watch band. In this application, a "band" may be a unitary device that connects to and holds a wearable computer on a person's body (which usually includes a spring means for expanding the band to allow it to fit over the person's hand), or it may denote plural band pieces that are designed to connect to a wearable computer and to removably connect to one another to form a unified band that can secure the wearable computer to a part of the person's body. A band is typically relatively thin. It may be narrow but it needs to be sufficiently wide to comfortably and securely hold the wearable computer on the body of the person. The band may be adjustable in length to accommodate different sizes of a body part to which it will be connected.

In this application, the term "wearable computer" means any electronic device that receives input and/or control signals, processes information, and provides an output, and which can be conveniently worn on the body of a person by means of a band that removably attaches the electronic device to a part of the person's body. The electronic device and the attachment device would not be unitary. A smart watch would be considered one type of wearable computer.

One type of wearable computer that is popular now is the so-called "smart watch". The smart watch is typically much more than just a "watch". It typically includes a fully functioning computer with input controls, at least one sensor, and a display screen. The smart watch may include a wireless communication function that enables the computer to access the internet and/or wireless networks. It may have other functional features. The computer of the smart watch may utilize Android®, Apple®, or other software operating systems. The smart watch is typically secured to the forearm of a person by a band, in the same manner as wristwatches have been for many years.

Wearable computers, such as the Apple Watch, the Pebble, or the WIMM One are typically secured to the user's forearm with one or more bands. The band may be relatively cheap and utilitarian, or it may be relatively expensive and decorative. The band may be designed to be fashionable in color, material, style, appearance, or any other factor. Since fashion changes and since people may want to coordinate the appearances of all the elements they wear, people may desire to purchase multiple different bands for their wearable computer.

The Apple Watch has foreseen this desire and has arranged its device so that bands can be easily connected and disconnected from the Apple Watch. The two ends of the unified band are each connected to a bar that can slide into a cooperating groove in the body of the Apple Watch to attach the strap end to the body. When the bar is in the proper position in the cooperating groove, a spring-loaded retractable cam engages with a cooperating hole in the groove of the watch body to secure the bar in the groove to the watch body and prevent it from sliding out of the groove until the user releases it. When the user wants to remove the band, the user can cause a button on the body of the watch to be depressed which depresses the spring-loaded cam into the bar, and enables the bar to slide out of the groove in the body of the Apple Watch. The user would push against either the watch or the band's bar or both to slide the bar into or out of the groove in the watch body as desired. This system is known and currently being sold for Apple Watch products.

Docking stations and charging stations are known in the art. For example, the NuDock™ power lamp station and the HEDock smartwatch dock each provide a docking and charging station for an Apple Watch. Similar products are made by Navitech and other companies. These stations provide docking for a single smartwatch. While the smartwatch can be removed from its associated strap while on the docking station, there is no means for holding either the strap or the watch on the station if the watch is removed from the strap.

BRIEF DESCRIPTION OF THE INVENTION

I have foreseen the need or desire of some users of wearable computers to possess multiple different straps for their wearable computers and to be able to easily remove, store, and attach the wearable computer to a particular strap. Therefore, a facility for storing multiple straps in one place would be desirable. It would also be desirable to have on the storage facility a way to charge the battery of a wearable computer while it is disposed on or near the storage facility. This concept will enable a user to store multiple straps for a wearable computer, enable the user to easily and quickly detach the wearable computer from one strap and attach it to another strap, and provide a place to store and charge the wearable computer when it is not being worn.

It would be desirable to have a single station on which plural different straps for at least one wearable computer could be held and stored, each strap being held in a position such that a wearable computer can be attached to the strap. It would be desirable for the user to use the single station to remove the wearable computer from one strap such that the strap remains in place until such time as the user again attaches a wearable computer or smartwatch to that strap. It would be desirable for the station to hold both the wearable computer in place on the station once it is removed from a particular strap, and to hold each of plural different straps in place on the station whether any particular strap is attached to a wearable computer or is not so attached. It would be desirable to provide a station on which a user can quickly and easily place a wearable computer with a first strap attached, remove the wearable computer from that first attached strap, and then attach the wearable computer to a second different strap and subsequently remove the wearable computer with the second strap attached from the station. It would be desirable to provide a battery charge to the battery of the wearable computer while it is disposed on or near the station.

A convenient way to store and change bands on a wearable computer comprises a station on which plural wearable computer bands can be disposed spaced apart from one another and held in place on the station, the wearable computer bands each having a first end that can be connected to the wearable computer and a second end that can be connected to the wearable computer. The station can comprise a means for holding each wearable computer band in a position such that the first end of each band is collinear, and the second end of each band is collinear. The station can also comprise a holding means for holding a wearable computer, the holding means capable of sliding along at least a part of the station.

A docking station can include a first holding means for immobilizing a first band connected to a wearable computer, a second holding means for immobilizing a second band to be connected to the wearable computer, a detaching means for unlocking the connector(s) between the first band and the wearable computer, a means for sliding the wearable computer alone to and mating the wearable computer to the second band such that the second band's connectors are locked onto the computer. Alternatively, instead of the bands' connectors locking onto the computer, the computer may be unlocked and removed from the first band's connectors and then locked to the second band's connectors.

A method of removing a first band from a wearable computer and replacing it with a second band can include the steps of (1) pushing the computer against at least one fixed prong to release at least a first connector of the first band from the computer; (2) immobilizing the first band and sliding the computer away from the first band's connector(s) and toward the second band's connector(s); (3) immobilizing the second band and sliding the computer into connection with at least the first connector of the second band; and (4) continuing the sliding of the computer until at least the first connector of the second band and the computer are locked together. Then, the second band can be released from its immobilization and removed with the wearable computer attached.

Alternatively, instead of pressing the computer against at least one fixed prong, the computer could be fixed temporarily and a prong pressed against the computer in such a way as to release the first connector of the first band from the computer. Alternatively, instead of immobilizing the first and second bands and sliding the wearable computer between them, the computer could be immobilized, the first band unlocked and slid away from the computer, and the second band slid into connection with the computer and locked into place. Since a band is usually connected to a wearable computer at two places, each of the two connections can be sequentially disconnected from the first band and connected to the second band, or the two connections first be simultaneously disconnected from the first band and then simultaneously connected to the second band, or any combination thereof.

BRIEF DESCRIPTION OF THE SEVERAL VIEWS OF THE DRAWINGS

FIG. 17a shows a perspective view of the band changing station without a mounting piece or bands, and a bridging portion (bp) spanning gap (g);

FIG. 18 shows a perspective view of the band changing station in a folded position;

FIG. 19 shows a perspective view of a one side of a prior art wearable computer;

FIG. 20 shows a perspective view of a second side of a prior art wearable computer;

FIG. 21 shows a side view of one side of a prior art wearable computer as viewed in the direction of arrow (a);

FIG. 22 shows a perspective view of the watch body joined to a band;

FIG. 23 shows a perspective exploded view of a watch body and attachment bar of a watch band.

DETAILED DESCRIPTION OF THE PREFERRED EMBODIMENTS

Figure 1:
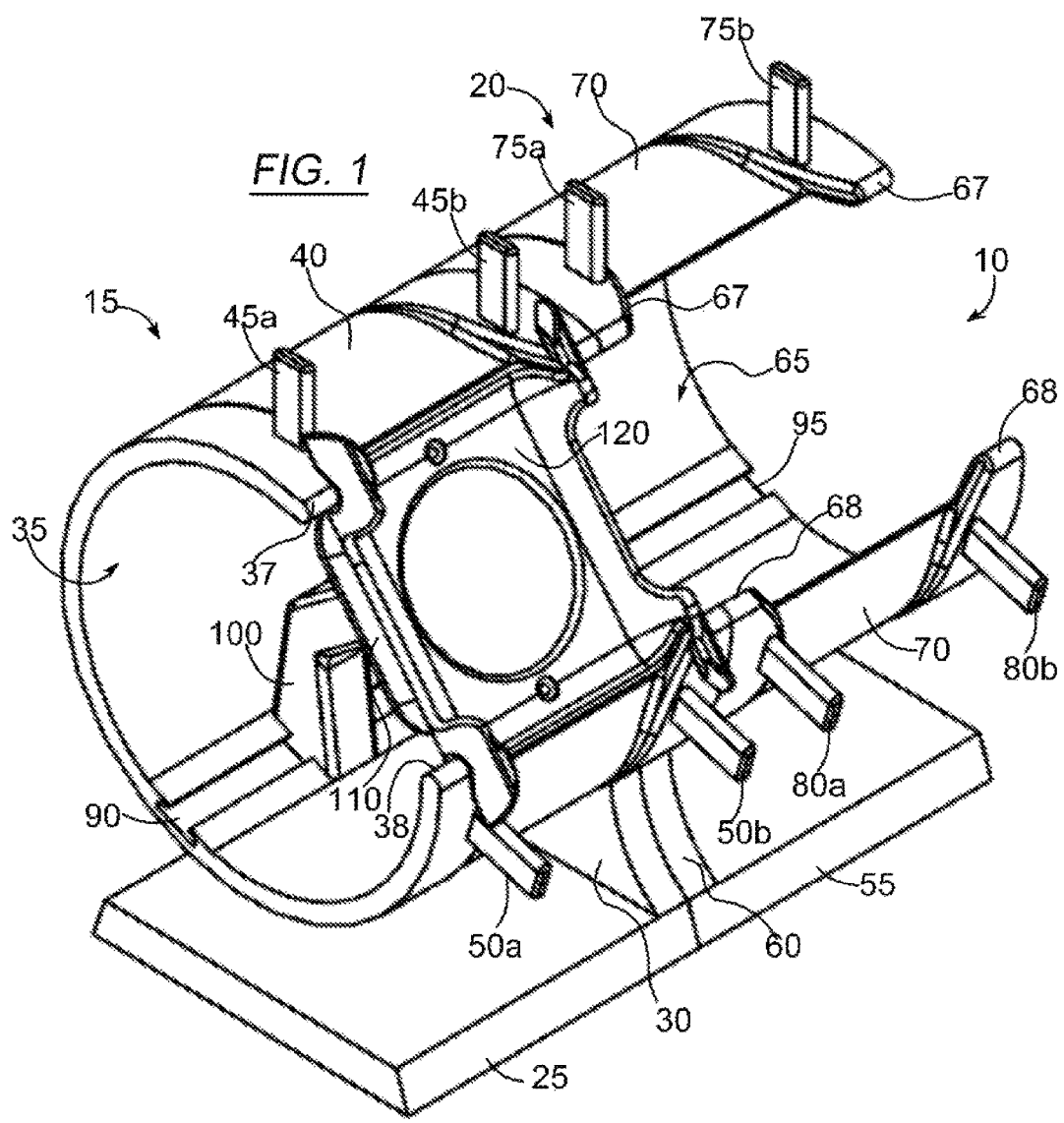
FIG. 1 shows a perspective view of a band changing station according to a first embodiment of this invention.

Reference Listing 10 band changing station
15 first band-holding module
20 second band-holding module
25 first base
30 first vertical arm
35 first band holder
37 edge
38 edge
40 depressed guide area
45 band clamps (top)
50 band clamps (bottom)
55 second base
60 second vertical arm
65 second band holder
67 edge
68 edge
70 depressed guide area
75 band clamps (top)
80 band clamps (bottom)
85 reserved
90 female guide groove (first module)
95 female guide groove (second module)
100 extension arm
105 male guide
110 broad head
115 moving unit
120 mounting piece
125 large hole
130 small hole
135 small hole
140 first prong
145 second prong
150 hooked projection (top)
155 hooked projection (top)
160 hooked projection (bottom)
165 hooked projection (bottom)
200 Apple Watch
210 first band
212 clasp with post
220 second band
230 first holding bar of first band 210
235 second holding bar of first band 210
240 first holding bar of second band 220
245 second holding bar of second band 220
250 release button on Apple Watch
260 groove in Apple Watch
270 sensor means
280 control button
285 control wheel
300 first strap of first band segment
305 buckle
306 buckle tongue
310 strap retainer
315 reserved
320 attachment bar
325 loop on first attachment bar
350 first cam
355 buckle tongue hole
400 case
405 first band holding module
410 second band holding module
415 first band holder
420 second band holder
425 mounting piece
430 open space
435 edge
440 edge
445 open space
450 edge
455 edge
460 band clamps
465 band clamps
470 band clamps
475 band clamps
490 large aperture in mounting piece
500 first small aperture in mounting piece
505 second small aperture in mounting piece
510 first prong
515 second prong
520 hooked projection
525 hooked projection
530 hooked projection
535 hooked projection
540 first band
545 second band
550 computing member

Definitions

In the following description the terms "docking station" and "mounting station" are used interchangeably. Unless otherwise explained, any technical terms used herein have the same meaning as commonly understood by one of ordinary skill in the art to which this disclosure belongs. The number blocks have sides and two faces which can be thought of as the readable sides. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting. It should be understood that the objects, features and aspects of any embodiment disclosed herein may be combined with the objects, features and aspects of any other embodiment disclosed herein.

The preferred embodiment of this invention is shown in FIG. 1. In that figure, a band changing station 10 comprises at least two band-holding modules 15 and 20. The first band-holding module 15 comprises a first base 25, a first vertical arm 30 connected to and extending vertically from the first base 25, and a first band holder 35 connected to the first vertical arm 30. The first base 25 is designed and adapted to rest on a relatively flat surface and to stably support the remainder of the first band-holding module 15. The first band holder 35 is connected to the first vertical arm 30 at the right side of the holder 35 in FIG. 1. The first base 25, first vertical arm 30, and first band holder 35 can each be formed of a material including, but not limited to, metal (steel or aluminum or the like), plastic or thermo-plastic, wood, or glass.

The first band holder 35 can have a generally tubular shape, but persons of ordinary skill in this art, after reading this specification, will understand that the first band holder 35 could have a different shape as long as it adequately holds a band placed on it and functions as described in this specification. The first band holder 35 is arranged in the general form of a tube, but there is an open side along the length of the tube such that the open side is bounded by edges 37 and 38 which form portions of a track for transitioning a watch body from one position to another. This open side is oriented as shown in FIG. 1 for reasons that will become apparent in this specification. The first band holder 35 is also open at both ends.

The first band holder 35 may have a slightly depressed guide area 40 that is suitable for holding a band for a wearable computer, whether the wearable computer is attached to the band or not. The depressed guide area is shaped and sized such that end portions of a watch-band supported therein are positioned to be colinear with edges 37, 38, the end portions of the watch-band and the edges 37, 38 forming a relatively smooth surface for sliding a watch body thereagainst. The depressed guide area 40 can extend completely around the first band holder 35 from edge 37 to edge 38. It may be desirable to cover the depressed guide area 40 in a velvety material, such as velveteen or the like.

The first band holder 35 has a first pair of opposing band clamps 45a and 45b disposed on opposing sides of the depressed guide area 40 near the edge 37. The first band holder 35 has a second pair of opposing band clamps 50a and 50b disposed on opposing sides of the depressed guide area 40 near the edge 38. The band clamps 45a and 45b, and 50a and 50b can each be moved between an open and a closed position as will be discussed below. The band clamps 45a and 45b will be used to grip and hold a first end of a band that is placed onto the first band holder 35. The band clamps 50a and 50b will be used to grip and hold a second end of a band that is placed onto the first band holder 35. The band clamps 45 and 50 may be made of a metal, such as steel or aluminum. The metal may be covered by a softer material such as rubber or plastic to prevent damage to any band.

The second band-holding module 20 comprises a second base 55, a second vertical arm 60 connected to and extending vertically from the second base 55, and a second band holder 65 connected to the second vertical arm 60. The second base 55 is designed and adapted to rest on a relatively flat surface and to stably support the remainder of the second band-holding module 20. The second band holder 65 is connected to the second vertical arm 60 at the left side of the holder 65 in FIG. 1. The second base 55, second vertical arm 60, and second band holder 65 can each be formed of a material including, but not limited to, metal (steel or aluminum or the like), plastic or thermo-plastic, wood, or glass.

The second band holder 65 can have a generally tubular shape, but persons of ordinary skill in this art, after reading this specification, will understand that the second band holder 65 could have a different shape as long as it adequately holds a band placed on it and functions as described in this specification. The second band holder 65 is arranged in the general form of a tube, but there is an open side along the length of the tube such that the open side is bounded by edges 67 and 68. This open side is oriented as shown in FIG. 1 for reasons that will become apparent in this specification. The second band holder 65 is also open at both ends.

The second band holder 65 may have a slightly depressed guide area 70 that is suitable for holding a band for a wearable computer, whether the wearable computer is attached to the band or not. The depressed guide area 70 can extend completely around the second band holder 65 from edge 67 to edge 68.

The second band holder 65 has a first pair of opposing band clamps 75a and 75b disposed on opposing sides of the depressed guide area 70 near the edge 67. The second band holder 65 has a second pair of opposing band clamps 80a and 80b disposed on opposing sides of the depressed guide area 70 near the edge 68. The band clamps 75a and 75b, and 80a and 80b can each be moved between an open and a closed position as will be discussed below. The band clamps 75a and 75b will be used to grip and hold a first end of a band that is placed onto the second band holder 65. The band clamps 80a and 80b will be used to grip and hold a second end of a band that is placed onto the second band holder 65. The band clamps 75 and 80 may be made of a metal, such as steel or aluminum. The metal may be covered by a softer material such as rubber or plastic to prevent damage to any band.

As is apparent in FIG. 1, the first and second band-holding modules 15 and 20 are designed to be of the same general size and shape, except for the placement of the vertical arms 30 and 60, which are disposed on opposite sides of their respective bases 25 and 55. In particular, the edges 37 and 67 of the two band-holding modules 15 and 20 should be generally aligned with one another. The edges 38 and 68 of the two band-holding modules 15 and 20 should be generally aligned with one another. The reason for the need for these two alignments will be explained below.

There is a female guide groove 90 disposed along the length of the interior of the first band holder 35 and a female guide groove 95 disposed along the length of the interior of the second band holder 65. Both ends of each female guide groove 90 and 95 are open. The two female guide grooves 90 and 95 are located and arranged such that they align with one another when the two band-holding modules 15 and 20 are disposed side-by-side as they are in FIG. 1. a guided member with a male part disposed in one of the female guide grooves can slide in an uninterrupted manner between both female guide grooves 90 and 95, and in either direction from them to another female guide groove of any other band-holding module that might be disposed next to either band-holding module 15 or band-holding module 20.

Figure 2:
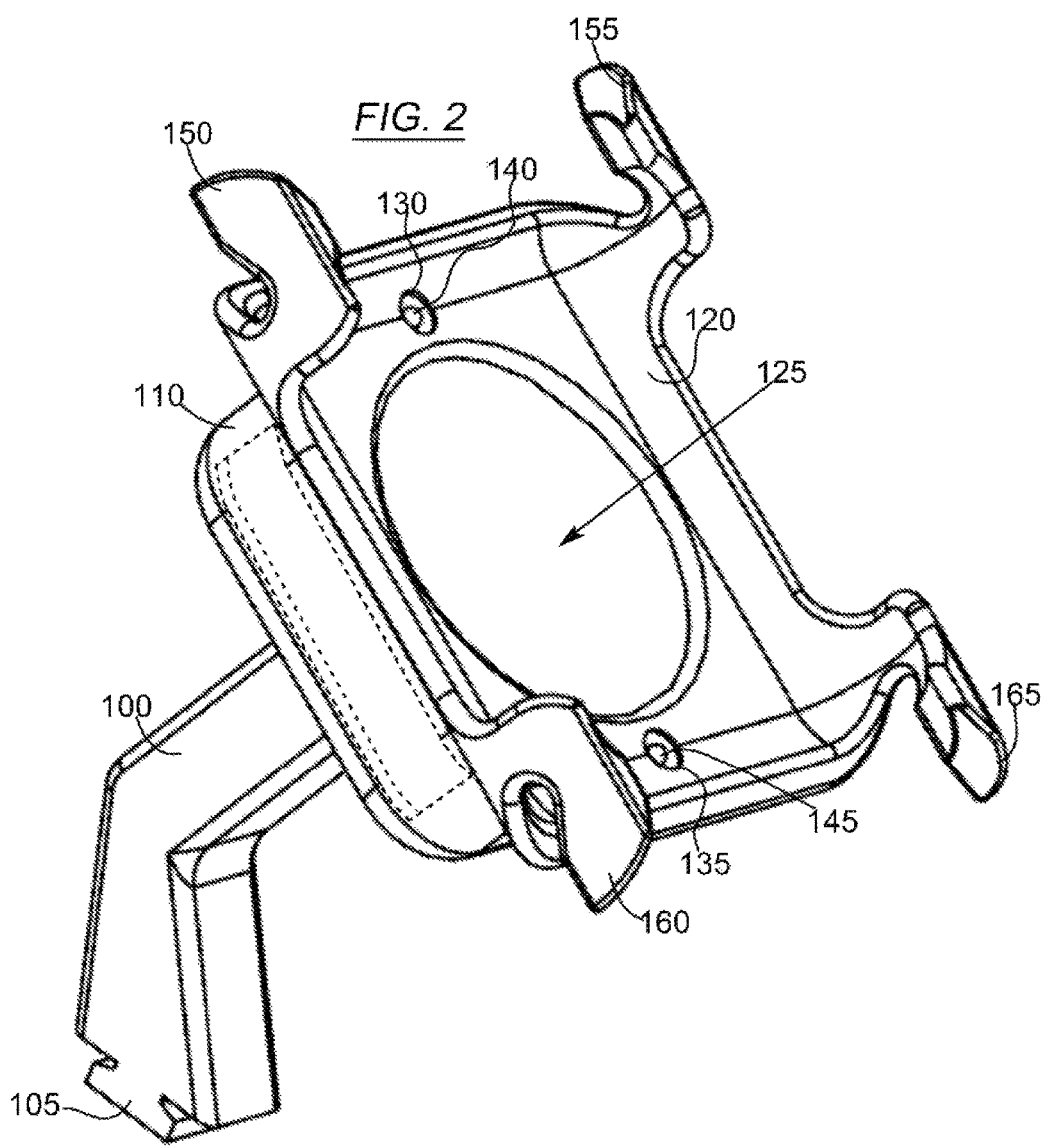
FIG. 2 shows a perspective view of the moving unit according to the first embodiment of this invention.

FIG. 2 shows another part of the band-changing station 10. In FIG. 2, there is shown an extension arm 100 having a male guide 105 that is adapted to fit in and slide along the female guide grooves 90 and 95. The extension arm 100 extends from the male guide 105 at one end of the extension arm 100 to a broad head 110 at the opposite end of the extension arm 100. The extension arm 100 is normally mounted within one of the band-holding modules with the male guide 105 inserted into a female guide groove of that particular band-holding module. The extension arm 100 and the broad head 110 can each be formed of a material including, but not limited to, a metal (such as steel or aluminum), a plastic or thermo-plastic, or wood. The broad head 110 may contain a mechanism to charge the power of the device that may be mounted on the band changing station 10. The charging device may be a magnetic charging cable that is inserted through an aperture shown in dashed line in the side of the broad head 110.

The extension arm 100, the male guide 105, and the broad head 110 can be one integral piece or they can be two or more separate pieces that are connected together. In the embodiment depicted however, the extension arm 100 is angled at approximately a 55-degree angle. It is also possible that the extension arm could be angled at an angle higher or lower than 55 degrees. The choice of where to place the female guide grooves 90 and 95 will control the angle at which the extension arm needs to be disposed. For example, if the female guide grooves is disposed medially relative to the space between the broad head, then the extension arm could be completely straight. This is a matter of design choice.

Attached to or integral with the broad head 110 on the side of the broad head opposite to the extension arm 100 is a mounting piece 120. The broad head 110 may include a means for charging an Apple Watch as is known in this art. The mounting piece 120 can be formed of a material including, but not limited to, plastic, aluminum, and wood. The mounting piece may preferably be rather thin and could be covered with a soft or velvety material, such as velveteen or the like so as to prevent damage to any device that is mounted on it. The mounting piece 120 has a shape designed to accomplish three purposes: it is designed to hold a wearable computer or a smart watch; it is designed to have funnel-shaped projections that will help align the band-mating process; and it is designed to have hooked projections that will fit on and slide along the edges 37, 38, 67, and 68 of the band-changing station 10 as will be shown in other drawings and described below. The combination of the mounting piece 120, the broad head 110, the extension arm 100, and the male guide 105 can be termed the moving unit 115. The moving unit 115 can freely travel between all of the band-holding modules by being pushed by a user.

The mounting piece 120 has a first relatively large hole 125 through its center. The mounting piece 120 also has two relatively small holes 130 and 135 through the mounting piece 120. The two holes 130 and 135 are disposed on opposite sides of the hole 125. A first prong 140 extends upwards through the hole 130 as shown in FIG. 2 and a second prong 145 extends upwards through the hole 135 as shown in FIG. 2. The prongs 140 and 145 may be formed from a material including, but not limited to, a plastic or a metal such as aluminum or steel or the like.

The extension arm 100 and mounting piece 120 can be mounted on one of the band-holding modules by inserting the male guide 105 into the female guide groove of the band-holding module while simultaneously mounting the hooked projections to the corresponding edges of the band-holding module. This would normally be done by sliding the extension arm 100 and mounting piece 120 into one open side of the tubular band-holding module. In FIG. 1, the extension arm 100 and mounting piece 120 have been placed into the band-holding module 15 with the male guide 105 inserted in the female guide groove 90. Persons of ordinary skill in this art will understand that this male-female guide combination is only one of the possible sliding mechanisms of the moving unit 115.

The mounting piece 120 has a first set of two hooked projections 150 and 155 disposed on one side of the mounting piece 120. The mounting piece 120 has a second set of two hooked projections 160 and 165 disposed on the side of the mounting piece 120 that is opposite from hooked projections 150 and 155. Hooked projections 150 and 155 are adapted to mount on and slide across the edges 37 and 67 of the band-changing station 10. Hooked projections 160 and 165 are adapted to mount on and slide across the edges 38 and 68 of the band-changing station 10.

It should be understood that, in other possible embodiments, the mounting piece 120 may not need to slide along the edges 37 and 38 because the male guide 105 and the female guide groove 90 accomplish this. The two grooves 260 in the Apple Watch 200, as it is held by the mounting piece 120, may instead slide along the edges 37 and 38. The mounting piece should (1) unlock the band's release buttons, (2) move the broad head 110, which may contain a Watch charging unit, below the Watch 200, and (3) help align the second band to be mated with the Watch 200.

When the male guide 105 is inserted into female guide groove 90, the hooked projections 150 and 155 will embrace edge 37 of the first band holder 35, and hooked projections 160 and 165 will embrace edge 38 of the first band holder 35. In this manner, the mounting piece 120 will be securely held on the first band holder 35, as seen in FIG. 1, and can slide freely left or right across the first band holder. Since the second band holder 65 is disposed directly adjacent to first band holder 35, the mounting piece 120 can also freely slide across the second band holder 65. In so doing, the male guide 105 would slide into and across the female guide groove 95; the hooked projections 150 and 155 would slide across edge 67 and the hooked projections 160 and 165 would slide across edge 68 of the second band holder 65. Thus, it is apparent that the mounting piece is capable of freely sliding back and forth across the two band holders 35 and 65. If there were third and fourth band holders disposed adjacent to band holders 35 and 65, on either side thereof, then the mounting piece could freely slide across the third and fourth band holders as well. It is apparent, then, that a user could arrange as many band holders as desired in series in the manner of band holders 35 and 65 as shown in FIG. 1, and the mounting piece 120 could easily slide back and forth across each and all of the band holders, since the male guide would slide across the female guide groove of each band holder and the two sets of hooked projections would be mounted on and slide across the two edges of each band holder in the same manner as described for band holders 35 and 65 above. Persons of ordinary skill in this art will understand that adjacent independent band holders may need to be secured to one another in some appropriate manner.

The particular hooked projections 150, 155, 160, and 165 shown in FIG. 2 are only one example of the many ways that persons of ordinary skill in this art could design the mounting piece 120 and obtain the function that is apparent. Other arrangements and designs could be conceived by persons of ordinary skill in this art who have read this disclosure and those designs would come within the scope of this invention. For example, instead of two separate hooked projections, there may be one broad hooked projection or there may be more than two hooked projections. Instead of hooked projections and the edges, there may be a rail and runner configuration, or some other means of enabling the mounting piece to slide sideways along the band-changing modules.

While the invention disclosed and described in this application and in this embodiment can be adapted for any wearable computer, the preferred embodiment described here has been specifically adapted for the "Apple Watch" which is a smartwatch that was released for sale in April 2015 by Apple Inc. The Apple Watch is capable of being attached to a band which can be placed around the forearm of a person. Bands designed for use with the Apple Watch are all currently made to be interchangeable. The Apple Watch has a slot at the top of the watchbody and a slot at the bottom of the watch body. These slots are designed to accept holding bars that are present at the ends of bands designed for the Apple Watch. The bands made by Apple Inc. and other manufacturers typically have holding bars that will slide sideways into the slots in the Apple Watch body. Each holding bar has one of several different means by which the band can be attached to the holding bar. The holding bar also has a spring-loaded male cam which can slide into the Apple Watch's slot. The slot has a female depression that corresponds to the male cam. When the holding bar is slid into the proper position in the slot of the Apple Watch body, the male cam is urged by the spring-loading into the female depression, thereby holding the holding bar firmly in the slot of the Apple Watch. There is a spring-loaded button on the body of the Apple Watch. This button is spring loaded and extends from the exterior of the watch body to the slot where the holding bar is disposed. When the user desires to remove the band, the user can depress the button on the watch body, which will depress the spring-loaded male cam on the holding bar. With the male cam depressed, the user can then slide the holding bar sideways out of the slot. This procedure would be repeated for the second holding bar on the opposite side of the Apple Watch. The band is then removed and a different band can be attached to the Apple Watch. For convenience sake, the Apple Watch will be called a watch herein.

Figure 3:
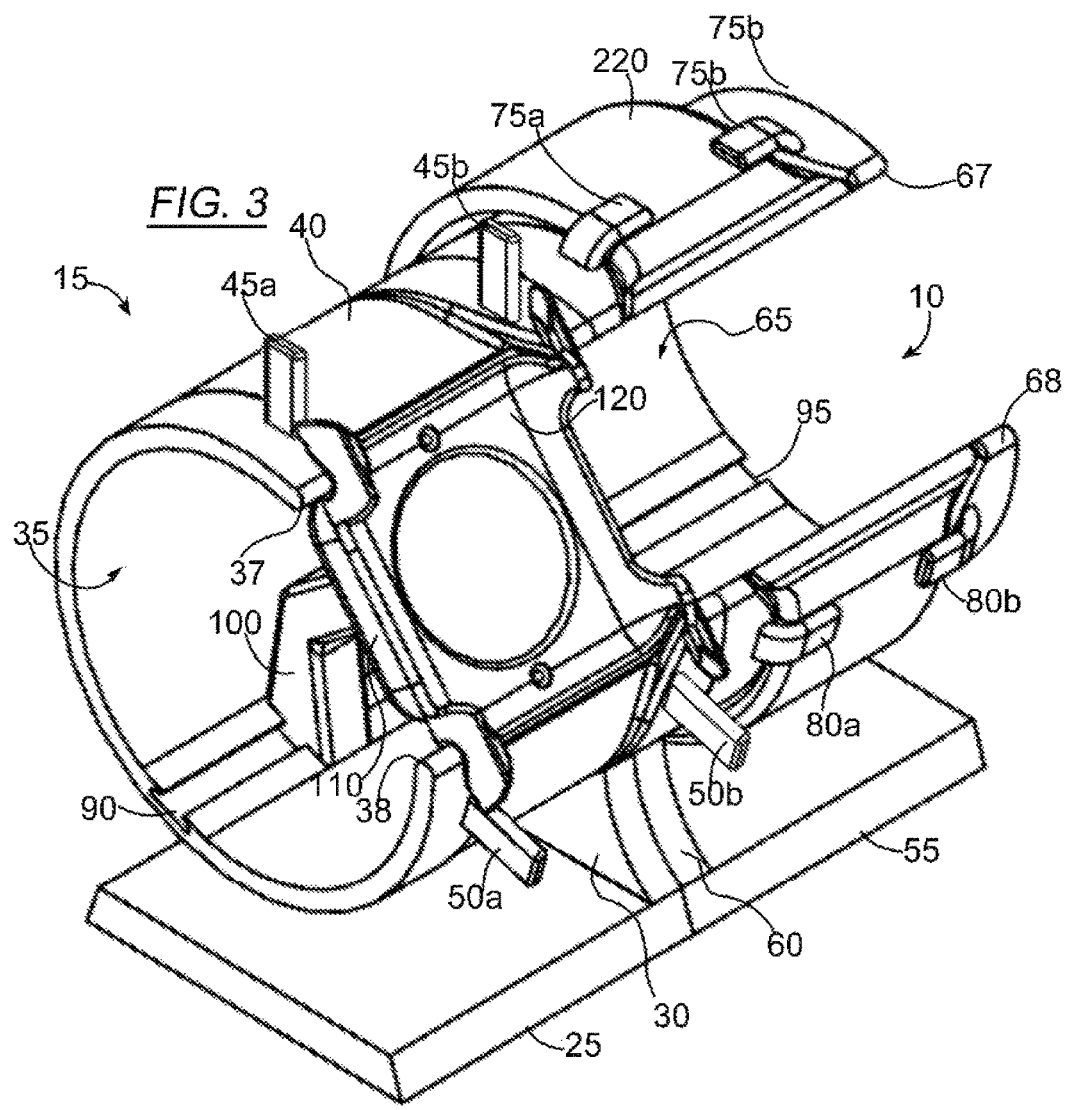
FIG. 3 shows a perspective view of the band changing station with a band mounted on the second band holder according to the first embodiment of this invention.

When adapted for an Apple Watch, my invention can be embodied in the device shown in the drawings, which can be utilized as follows. In FIG. 3, the band-changing station 10 is situated to receive an Apple Watch 200 connected to a first band 210. References to Apple Watch 200 refer to the body of the Apple Watch without a band. The moving unit 115 is disposed at the first band-holding module 15 and the moving unit's mounting piece 120 does not contain a watch or a band. A second band 220 that is not connected to a watch is disposed on the second band-holding module 20 and is held at both ends of the band by closed band clamps 75a and 75b, and closed band clamps 80a and 80b, as shown in FIG. 3. The second band 220 has a first holding bar 240 at one end of the band 220 and a second holding bar 245 at the opposite end of the band 220. These two holding bars 240 and 245 are adapted to slide into corresponding grooves in the Apple Watch 200 and be secured in those grooves, as is known in this art. The band clamps securely hold the two holding bars 240 and 245 of the second band 220 in their desired positions.

Figure 4:
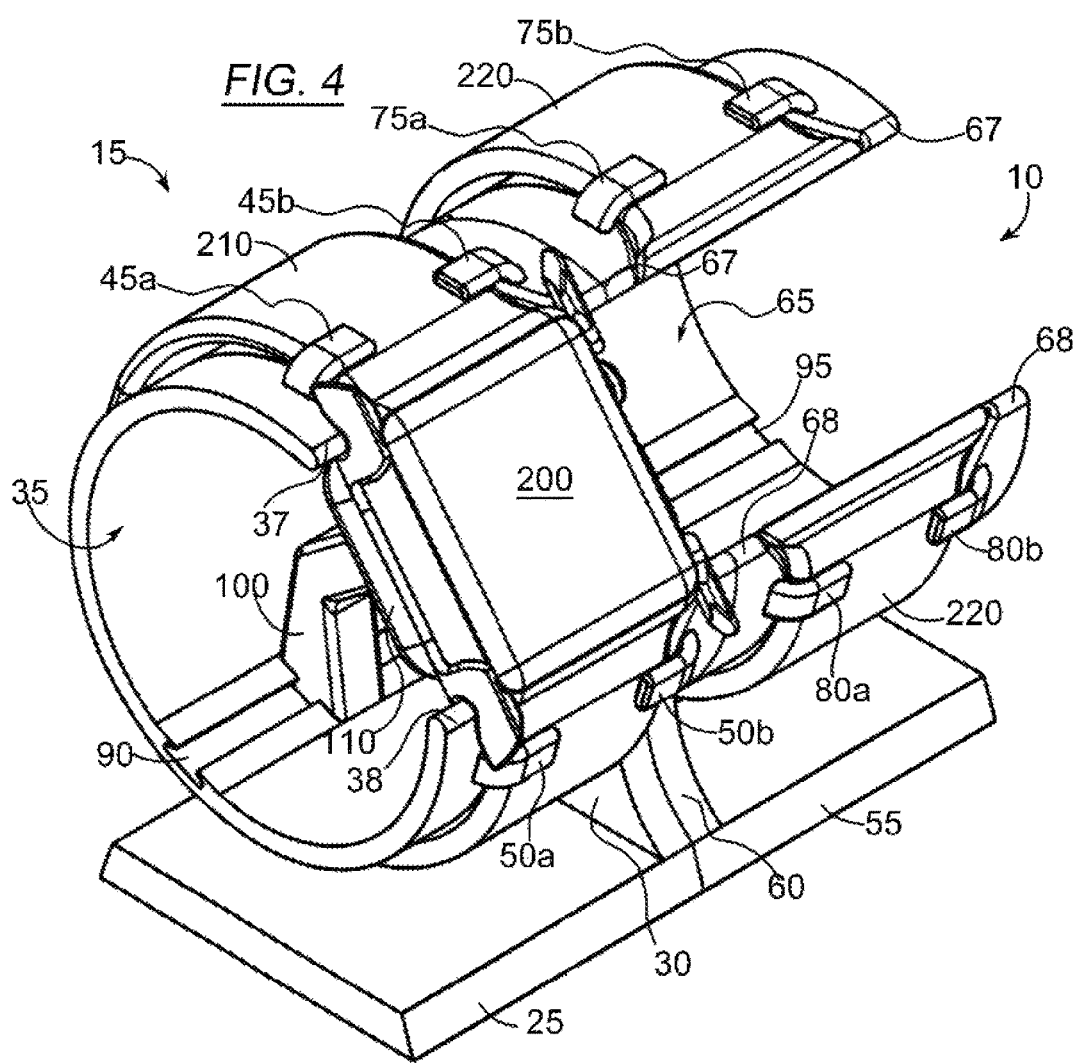
FIG. 4 shows a perspective view of the band changing station with bands mounted on both band holders according to the first embodiment of this invention.

In FIG. 4, the Apple Watch 200 and the band 210 to which the Apple Watch is attached has been mounted on band-changing station 10 at the first band-holding module 15. The second band 220 with no Apple Watch attached remains mounted on the second band-holding module 20. The first band 210 is secured to the first band-holding module 15 by band clamps 45a and 45b, and 50a and 50b, which are all in their closed position in FIG. 4. Both the first band 210 and the second band 220 each preferably have their two segments joined together by their respective clasps or buckles if either band has such a clasp or buckle. Some bands may be unitary without any clasp or buckle. The band 210 has a first holding bar 230 at one end of the band 210 and a second holding bar 235 at the opposite end of the band 210. The two holding bars 230 and 235 of band 210 are adapted to slide into corresponding grooves in the Apple Watch 200 and be secured in those grooves, as is known in this art.

Figure 5:
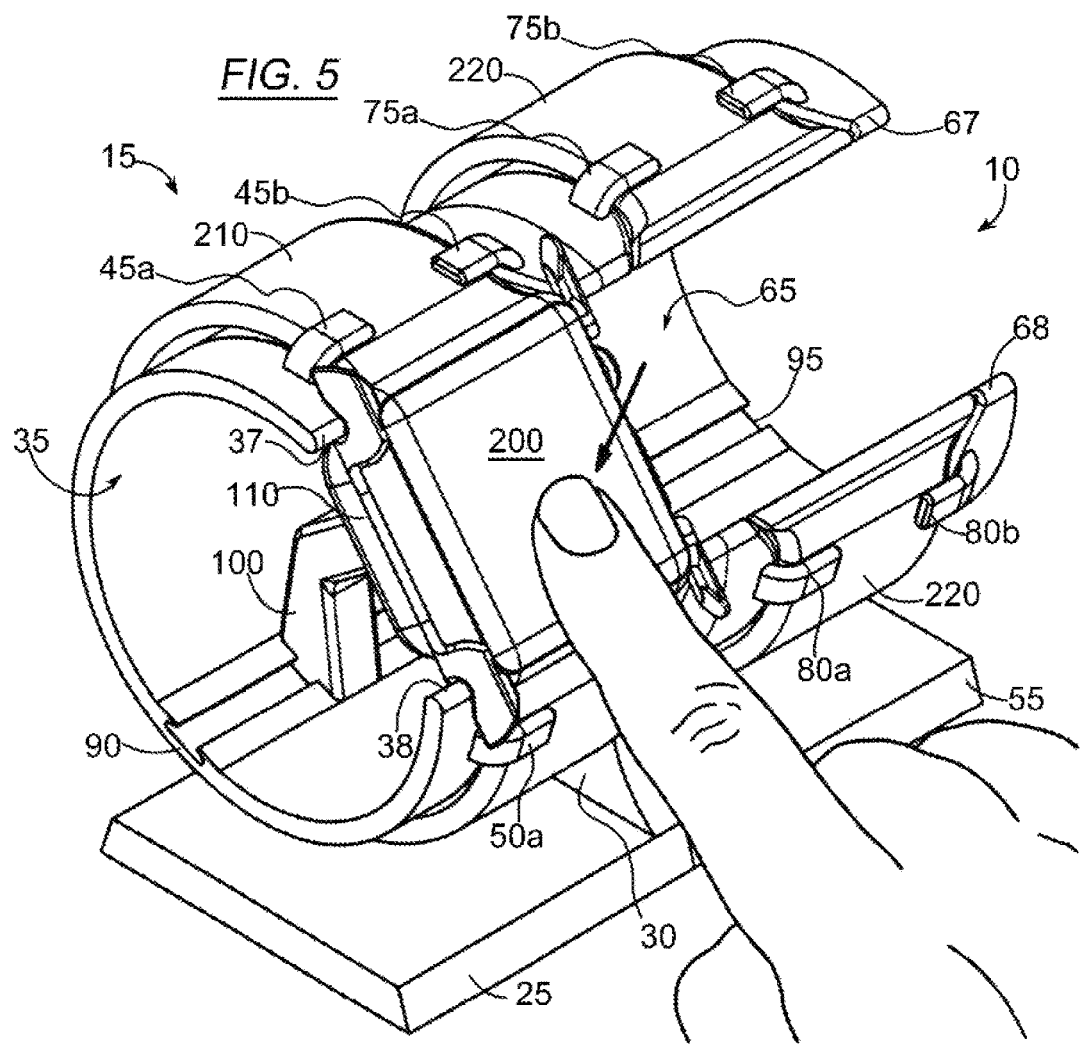
FIG. 5 shows a perspective view of the band changing station as a wearable computer begins to have its band changed according to the first embodiment of this invention.

In FIG. 5, in order to disconnect the Apple Watch 200 from the first band 210, a person can press down on the face of the Apply Watch 200 as is shown in FIG. 5. As will be explained below, this will cause the connection between the Apple Watch 200 and both ends of the first band 210 to be unlocked. The Apple Watch 200 and the mounting piece 120 on which the Apple Watch is mounted can both then be slid (to the right in FIGS. 5 and 6) toward the second band-changing module 20. As the Apple Watch 200 slides to the right, the first band 210 remains stationary on the first band-holding module 15, held by band clamps 45 and 50. As the Apple Watch 200 slides to the right, the two holding bars 230 and 235 of band 210, which were disconnected by pushing down on the Apple Watch 200 and then immediately pushing the Apple Watch to the right, remain stationary and the Apple Watch slides to the right.

Figure 6:
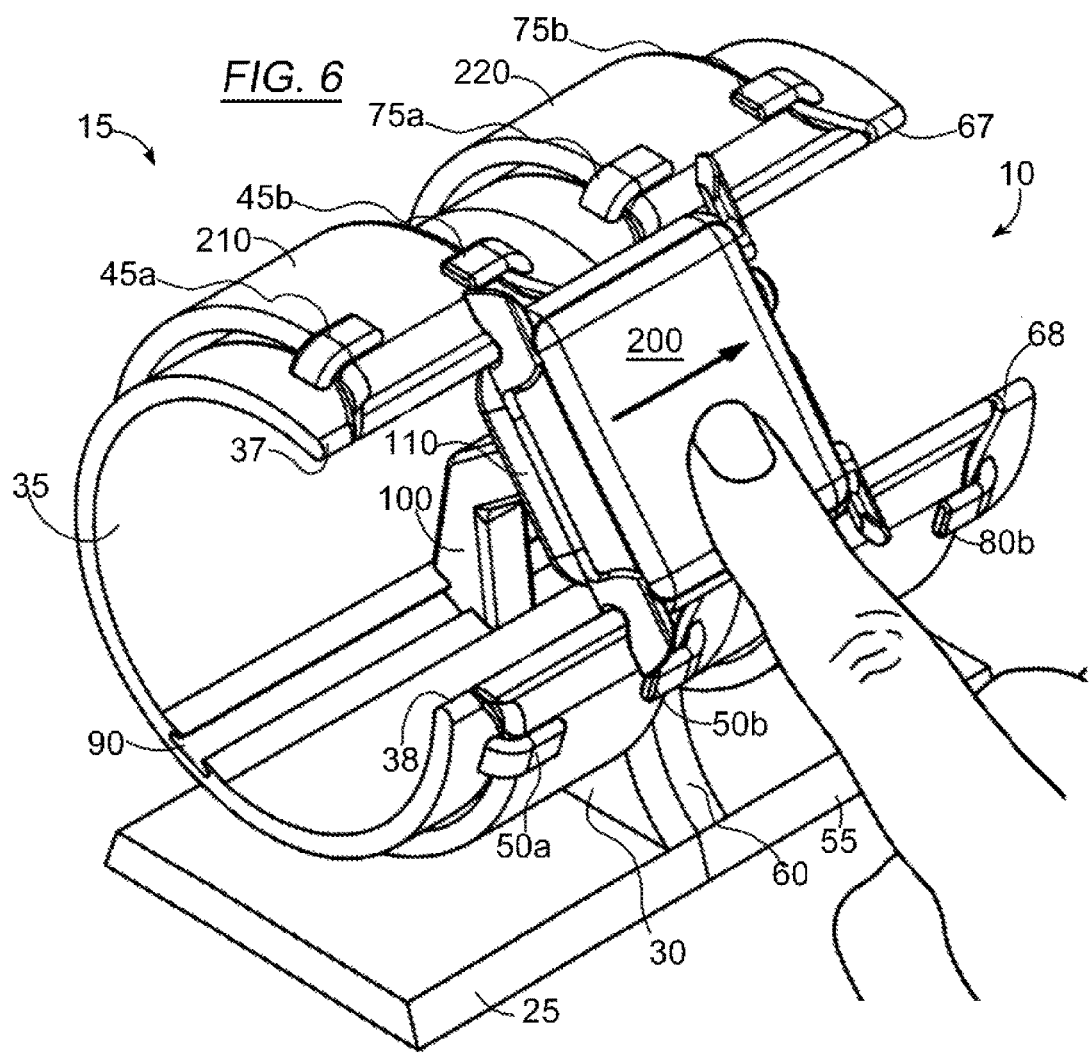
FIG. 6 shows a perspective view of the band changing station as a wearable computer is in the process of changing bands according to the first embodiment of this invention.

As the person pushes the Apple Watch 200 to the right in FIG. 6, the mounting piece 120, on which the Apple Watch 200 is mounted, and the broad head 110, the extension arm 100, and the male guide 105 are all pushed to the right as well. The male guide 105 slides to the right within the female guide 90 and, as the mounting piece 120 slides from the first band-holding module 15 to the second band-holding module 20, the male guide 105 exits the female guide 90 and enters the adjacent female guide 95 of the second band-holding module 20. The female guide 95 guides the male guide 105 and keeps the combination of the extension arm 100, the broad head 110, and the mounting piece 120 in the proper alignment.

Figure 7:
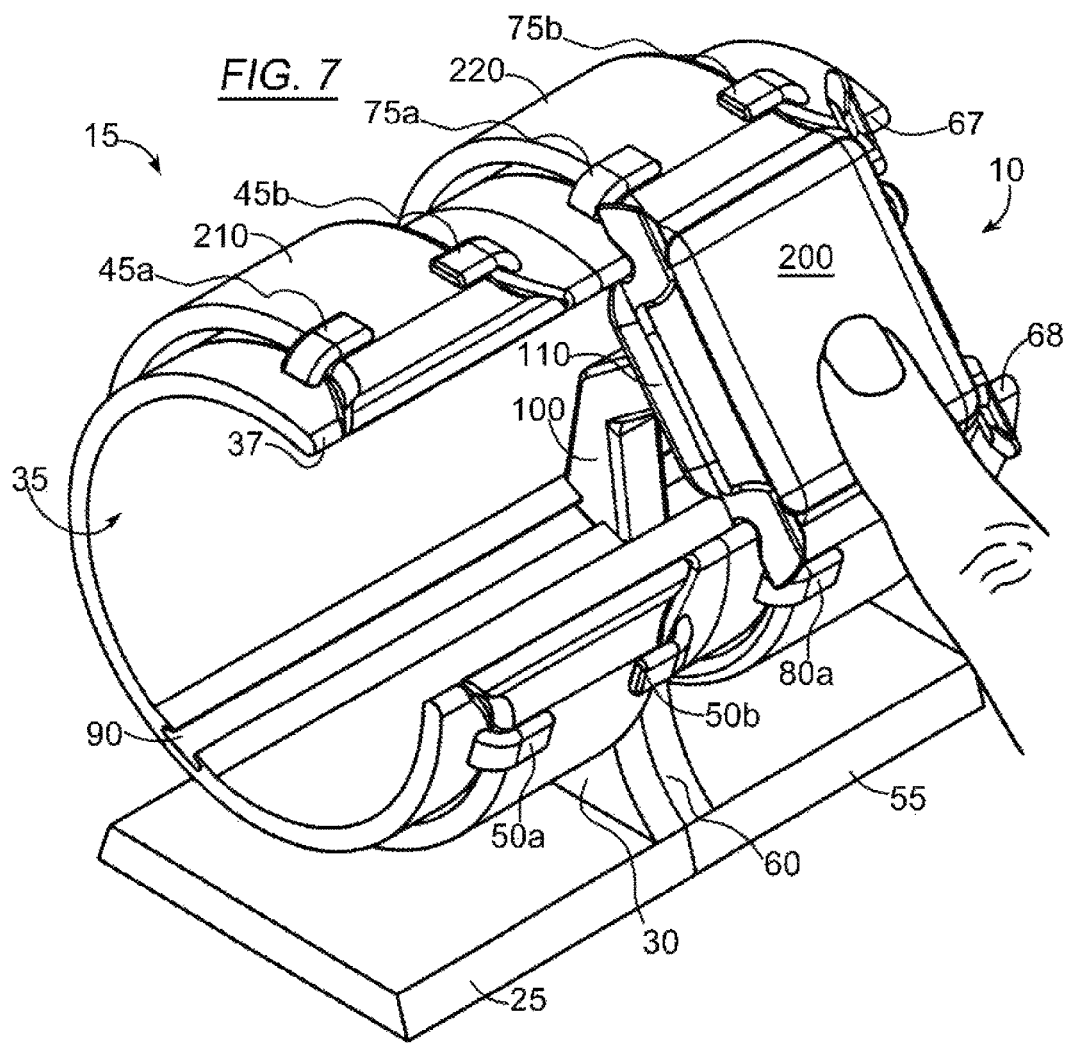
FIG. 7 shows a perspective view of the band changing station as a wearable computer finishes the process of changing bands according to the first embodiment of this invention.
Figure 8:
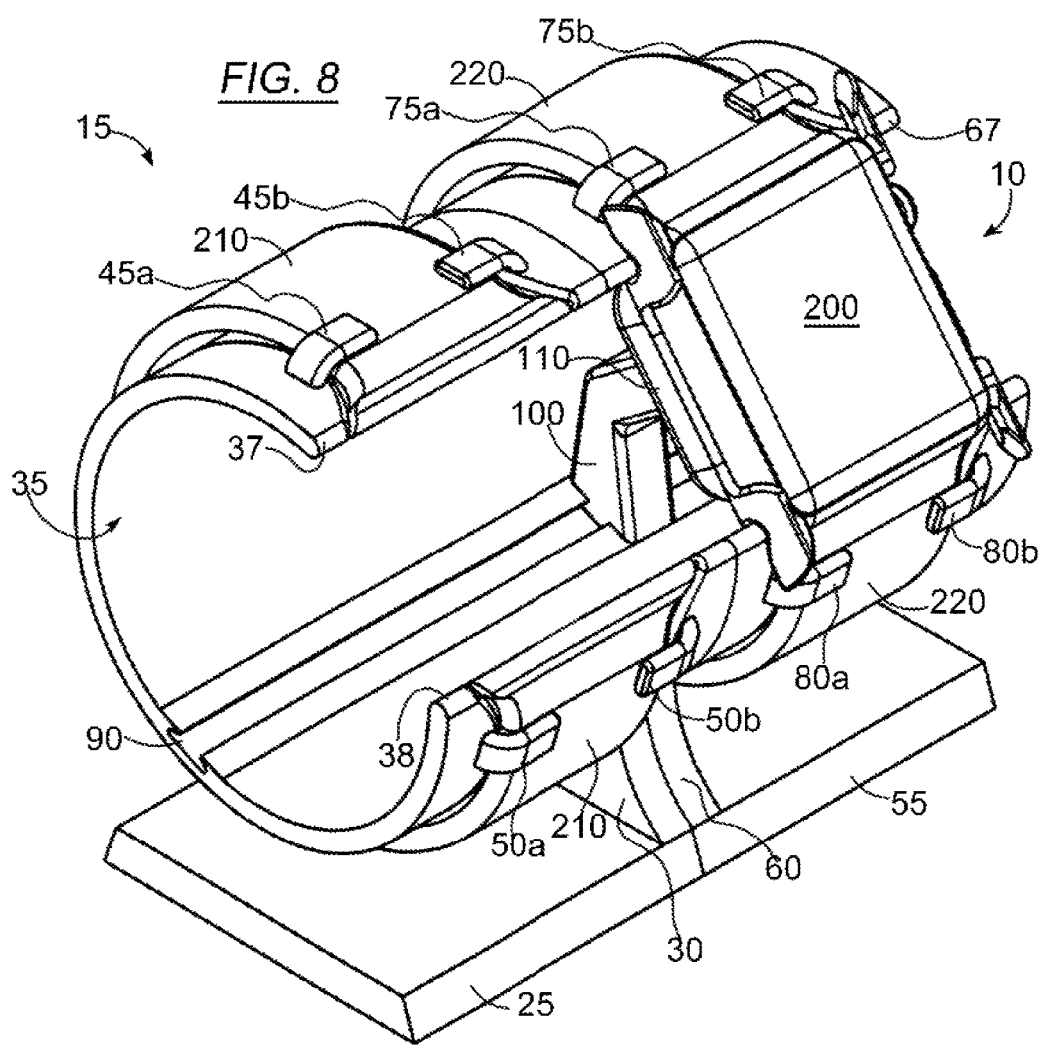
FIG. 8 shows a perspective view of the band changing station with bands mounted on both band holders according to the first embodiment of this invention.

As the Apple Watch 200 continues to be pushed to the right by the person's finger as shown in FIG. 6, the two grooves in the Apple Watch 200 begin to be entered by the two holding bars 240 and 245 of the second band 220. As the Apple Watch 200 continues to be pushed to the right by the person's finger, the Apple Watch 200 will reach the position such that the two holding bars 240 and 245 of the second band are properly disposed within the two grooves of the Apple Watch 200. This is shown in FIG. 7. At this position, the two holding bars 240 and 245 will be secured within their respective grooves of the Apple Watch 200 by securing cams. The person will feel or hear the sound of the cams snapping into place, and will know that the band 220 is secured to the Apple Watch 200. The person will then remove his or her finger from the Apple Watch 200 and the Apple Watch 200 has successfully had its band changed from band 210 to band 220, as seen in FIG. 8. The band 210, which is now not connected to the Apple Watch 200 can remain on the first band-holding module 15, or it can be removed from the module by opening the band clamps 45 and 50 and removing the band 210. The band 220 which is now attached to the Apple Watch 200 can remain on the second band-holding module 20 or the band 220 and Watch 200 can both be removed from the module 20 by opening band clamps 75 and 80.

Figure 9:
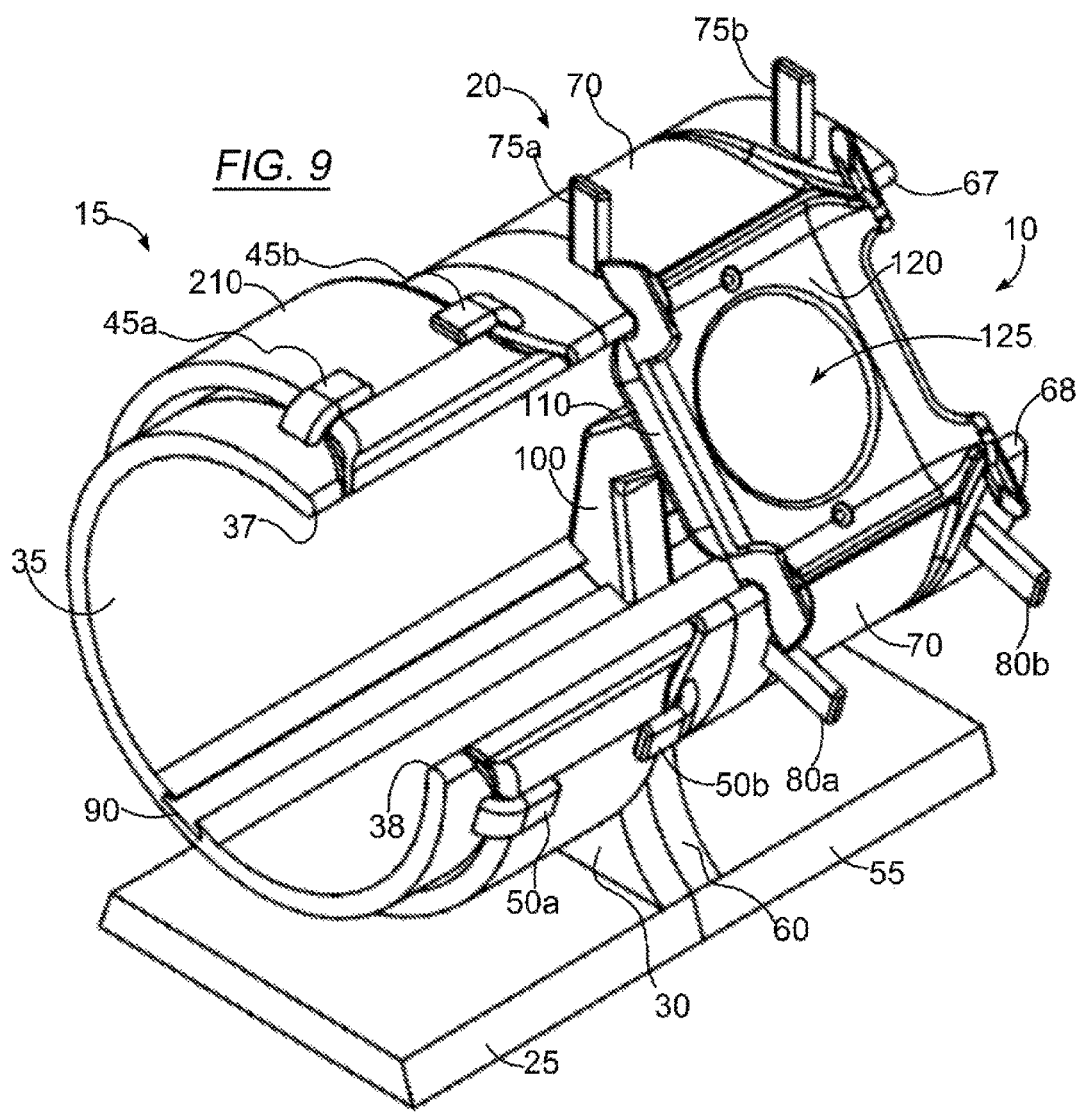
FIG. 9 shows a perspective view of the band changing station with a band mounted on the first band holder according to the first embodiment of this invention.

In FIG. 9, the Apple Watch 200 and the second band 220 have been removed from the second band-holding module 20 and band clamps 75 and 80 remain in their open positions. The first band 210 remains on the first band-holding module 15 with the band clamps 45 and 50 remaining in their closed positions.

One can understand that the Apple Watch 200 and the second band 220 (or any other band that happened to be connected to the Apple Watch 200) could be placed on the second band-holding module 20 in FIG. 9, the band clamps 75 and 80 moved to their closed positions, and the Apple Watch 200 could be pressed down and moved to the left in FIG. 9. This pressing down by a person would unlock the band from the Apple Watch 200, and the Apple Watch 200 would alone slide to the left while the band remained on the second band-holding module 20. The Apple Watch's grooves would slide onto the two waiting holding bars 230 and 235 of first band 210 and, at the proper position, the cams would snap into corresponding recesses to secure the Apple Watch 200 to the first band 210. The band clamps 45 and 50 could then be moved to their open position, and the Apple Watch 200 with first band 210 now connected to it could be removed from the band changing station 10 by moving them to the left and off the station. This process is not illustrated but a person of ordinary skill in this art will understand it after having read this disclosure.

In this manner, a person can store plural bands on a band changing station 10, and can easily and quickly disconnect an Apple Watch from one band and connect it to another band, and then remove the Watch and connected band from the band changing station 10. Plural bands can be stored on the plural band-holding modules of this band changing station.

The person of ordinary skill in this art will also realize, after reading this disclosure, that any number of band-holding modules can be utilized simply by placing a band-holding module that is open on the left adjacent to a band-holding module that is open on the right, or vice versa. When placed adjacent one another in this manner, the mounting piece 120 and its associated extension arm 100 and male guide 105 can traverse from one band-holding module to another by pushing the Watch mounted on the mounting piece 120 (or by pushing just the unoccupied mounting piece 120) to the left or right as needed. The male guide 105 is inserted in and can slide along the female guide groove 90.

Figure 10:
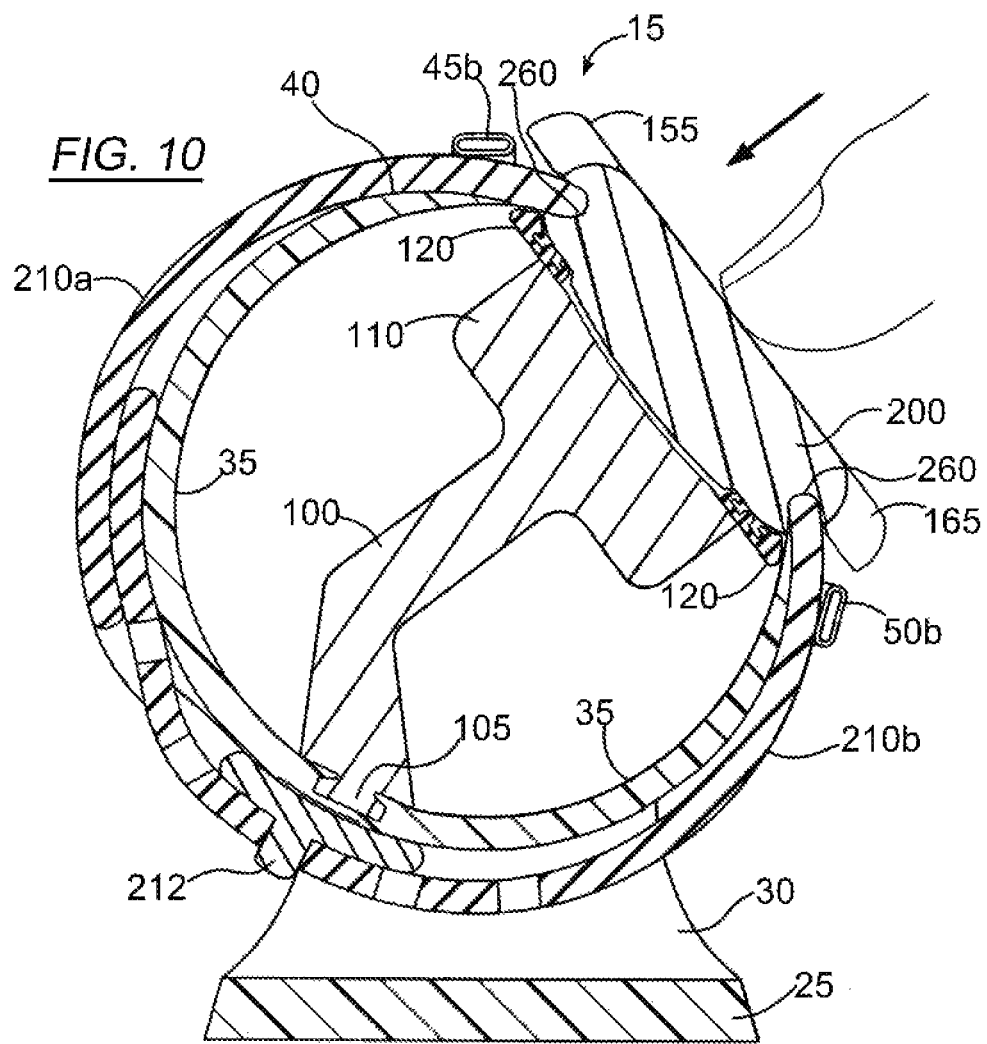
FIG. 10 shows a side view of the band changing station according to the first embodiment of this invention.

Proceeding now to FIG. 10, this drawing show a cut-away side view of the first band-holding module 15 of the band changing station 10. In FIG. 10, the person's finger has just touched the face of the Apple Watch 200, but has not yet started pushing downwards onto the face of the Watch. The Apple Watch 200 is held in the mounting piece 120 and is secured by hooked projections 150 (not shown), 155, 160 (not shown), and 165. The Apple Watch 200 is connected to the first band 210. The first band 210 is wound around the first band holder 35 of the first band-holding station 15. The first band 210 is not a unitary band but has two cooperating segments 210a and 210b which are coupled together by means of a clasp 212 having a post. The clasp 212 is integral with or connected to the band segment 210a. The post of the clasp 212 has been inserted into one of a series of cooperating holes on band segment 210b thereby joining together the two band segments 210a and 210b on the side of the band 210 generally opposite to the Apple Watch 200. In FIG. 10, the large hole 125 in mounting piece 120 is visible between the back side of the Apple Watch 200 and the broad head 110. The band 210 is still locked on the Watch in FIG. 10 because the prongs 140 and 145 do not press on the two release buttons 250 and 255 that are disposed on the back side of the Watch 200.

Figure 11:
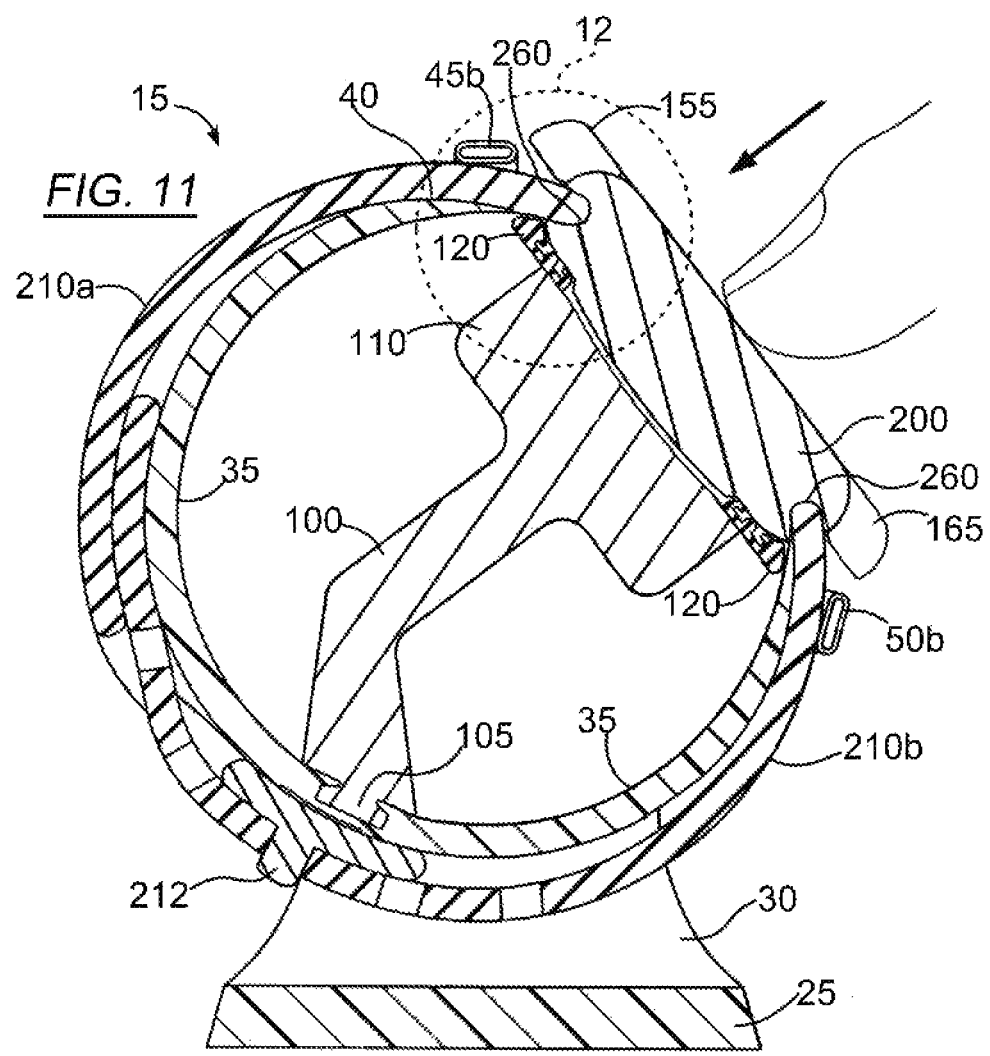
FIG. 11 shows a side view of the band changing station as it is being pressed on according to the first embodiment of this invention.

FIG. 11 shows the person's finger now pressing down upon the face of the Apple Watch 200, which presses the back side of the Apple Watch 200 through the hole 125 in the mounting piece 120 and against the face of the broad head 110. The movement of the Apple Watch 200 can happen because the mounting piece 120 is somewhat flexible in nature. This pressing movement by the person brings the Watch 200 closer to the prongs 140 and 145, which causes the two release buttons 250 and 255 to be fully pressed, thereby unlocking the band 210 from the Watch 200.

In FIG. 11, the two small holes 130 and 135 in the mounting piece 120, and the first prong 140 and the second prong 145 are also visible. However, due to their relatively small size, the area inside the circle is shown larger in FIG. 12.

On the back side of the Apple Watch 200, as it is currently being made, there are two release buttons 250 and 255 contained within the Apple Watch 200. Each of the two release buttons 250 and 255 is connected to respective cams within the Apple Watch. Pressing either of the release buttons 250 or 255 will push that button's connected cam which will unlock the holding bar that is disposed in the groove proximate to that button.

Figure 12:
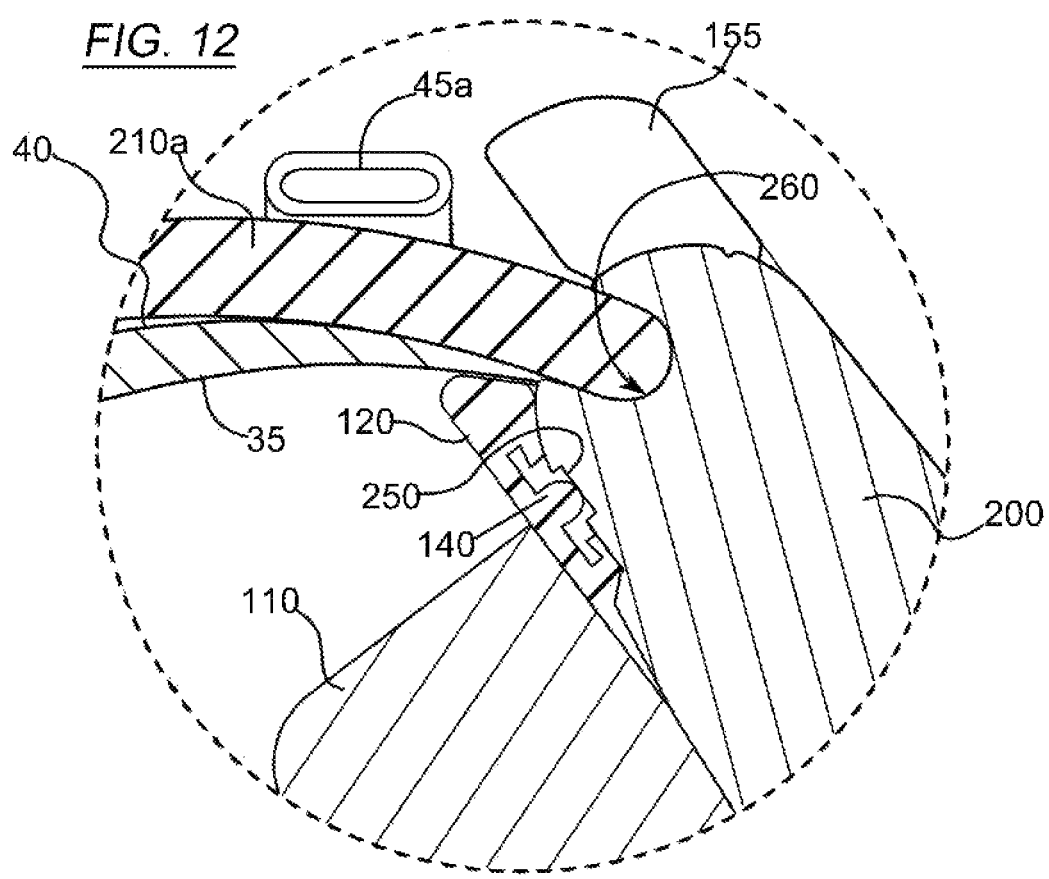
FIG. 12 shows a detail view from FIG. 11 according to the first embodiment of this invention.

FIG. 12 shows a detail blowup of the area within the circle of FIG. 11. In FIG. 12, the broad head 110 and the mounting piece 120 are shown pressed against the back side of the Apple Watch 200. The first band 210a is shown locked into the first groove 260 in the body of the Apple Watch 200. By the person pressing against the face of the Apple Watch 200, the back of the Watch has been pushed up against first prong 140, which now presses against the first release button 250 of the Apple Watch 200. The action of the first prong 140 pressing against the first release button 250 unlocks the locking mechanism that secures the band 210a in the first groove 260 of the body of the Apple Watch 200. While the locking mechanism is unlocked, the person can then push the Apple Watch 200 sideways which will cause the first groove 260 to slide along and then away from the first band 210a, thereby removing the first band 210a from the Apple Watch 200.

Second Embodiment

Referring generally to FIGS. 13-18, a second embodiment of a portable band changing case includes a case 400 having a first band holding module 405 and a second band holding module 410 that include respectively, a first band holder 415 and a second band holder 420, aligned in a side-by-side arrangement such that mounting piece 425 may be slidably transitioned from a first position mounted atop the first band holder to a second position mounted atop the second band holder, or vice versa. The first band holder 415 includes an open space 430 bounded by edges 435 and 440 that serve as a guide for slidable movement of mounting piece 425. Likewise, the second band holder 420 includes an open space 445 bounded by edges 450 and 455 that serve as a guide for slidable movement of mounting piece 425. The first band holder 415 includes a first pair of band clamps 460a and 460b, and a second pair of band clamps 465a and 465b disposed opposite the first pair. Similarly, the second band holder 420 includes a first pair of band clamps 470a and 470b, and a second pair of band clamps 475a and 475b disposed opposite the first pair. While in the particular embodiment shown, the band clamps are bendable or deformable and may include elastomeric elements over a wire armature in order to transition at least from a first position to a second position, other means for pivoting or repositioning the band clamps such as hinges may be used without departing from the present invention. Static clamping may be used as well, since the purpose is to hold the band ends in position.

Figure 13:
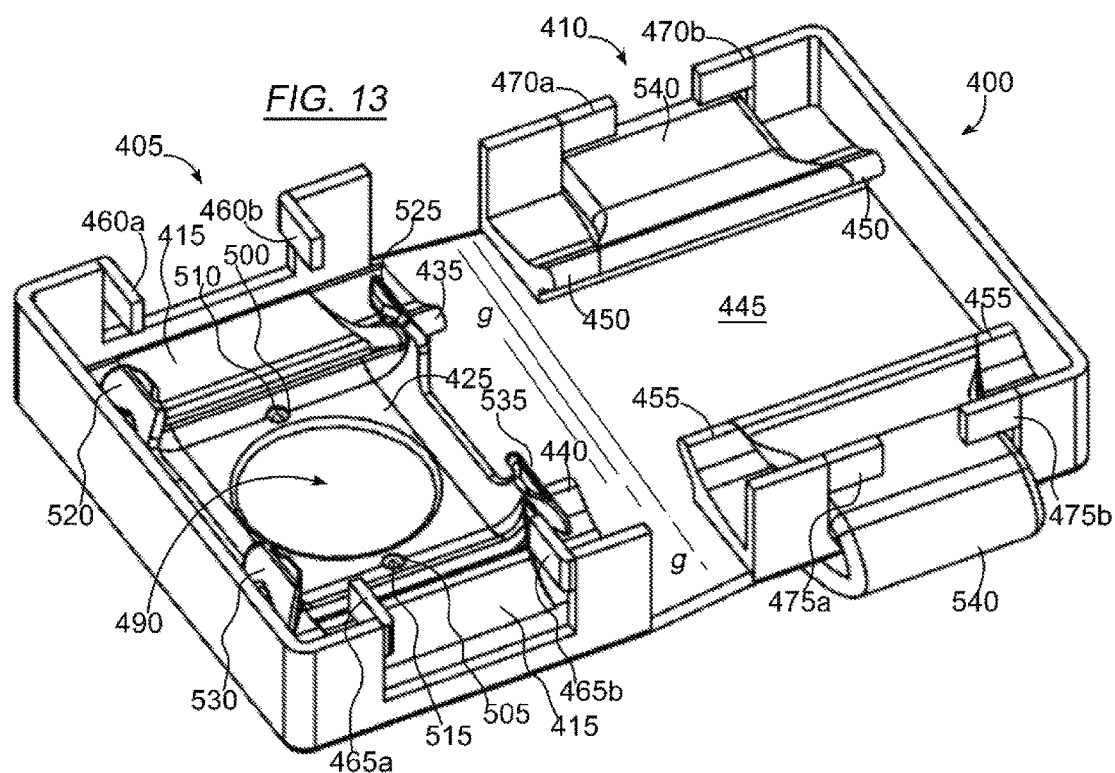
FIG. 13 shows a perspective view of a band changing station according to a second embodiment of this invention.

The mounting piece 425, shown in FIG. 13 resting atop a first band-holding module 405, is similar to the uppermost portion of the embodiment shown in FIG. 2. On either side of aperture 490 are two smaller apertures 500 and 505. A first prong 510 extends upwards through the aperture 500 and a second prong 515 extends upwards through aperture 505. Mounting piece 425 has a first set of hooked projections 520 and 525 disposed on one side of the mounting piece, and a second set of hooked projections 530 and 535 disposed opposite the first set of hooked projections. When mounting piece 425 straddles module 405, hooked projections 520 and 525 are configured to embrace edge 435 of the first band holder 415, and hooked projections 530 and 535 are configured to embrace edge 440 of the first band holder 415. In this manner, as shown in FIG. 13, the mounting piece 425 will be securely held on the first band holder 415, and can slide freely left or right across the first band holder. Since the second band holder 420 is disposed directly adjacent to first band holder 415, the mounting piece 425 can also freely slide across the second band holder 420. In so doing, hooked projections 520 and 525 slide across edge 450 and the hooked projections 530 and 535 slide across edge 455 of the second band holder 420. Thus, it is apparent that the mounting piece is capable of freely sliding back and forth across the two band holders 415 and 420. Owing to the alignment of the first and second band holders, it becomes apparent that multiple band holders may be placed in side-by-side alignment permitting the mounting piece to be slidably transitioned from one band holder to the next. The particular hooked projections 520, 525, 530, and 535 shown in FIG. 13 are only one example of the many ways that persons of ordinary skill in this art could design the mounting piece 425 and obtain the function that is apparent. Other arrangements and designs could be conceived by persons of ordinary skill in this art having access to this disclosure and those designs would come within the scope of this invention. For example, instead of two separate hooked projections, there may be one broad hooked projection or there may be more than two hooked projections. Instead of hooked projections and the edges, there may be a rail and runner configuration, or some other means of enabling the mounting piece to slide sideways along the band-changing modules.

In FIG. 13, the first band holding module 405 is shown supporting mounting piece 425 and the second band holding module 410 retains a first band 540 of a wearable computer. Note that band clamps 470*a* and 470*b*, and band clamps 475*a* and 475*b* of the second band holding module 410 are disposed in a band retaining position to retain the ends of first band 540 in a relatively compressed position.

Figure 14:
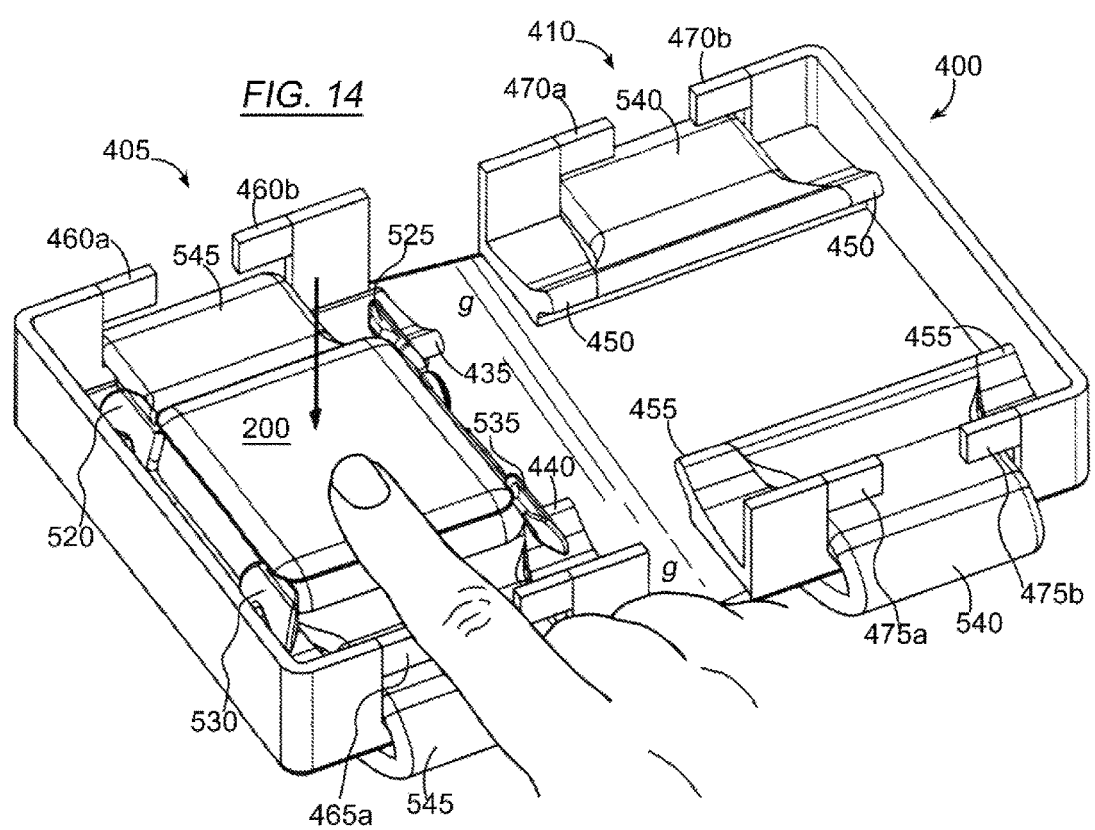
FIG. 14 shows a perspective view of the band changing station as a wearable computer begins to have its band changed according to the second embodiment of this invention.
Figure 15:
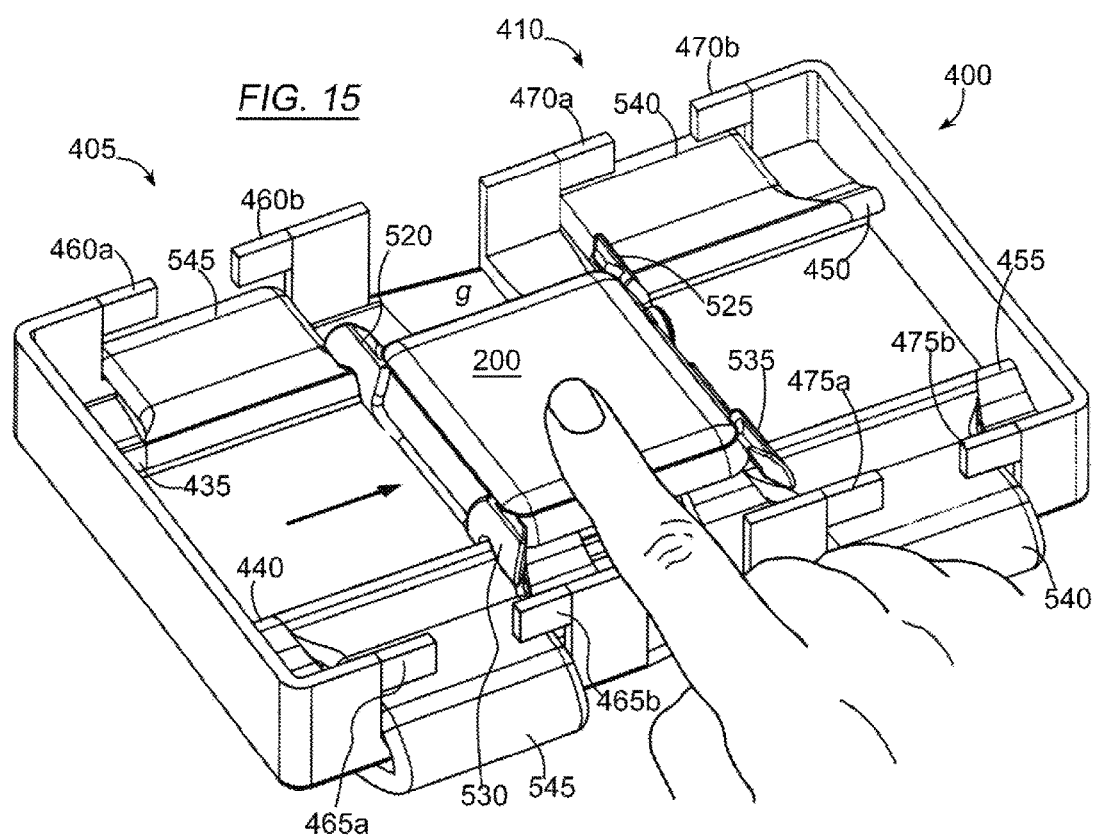
FIG. 15 shows a perspective view of the band changing station as a wearable computer is in the process of changing bands according to the second embodiment of this invention.
Figure 16:
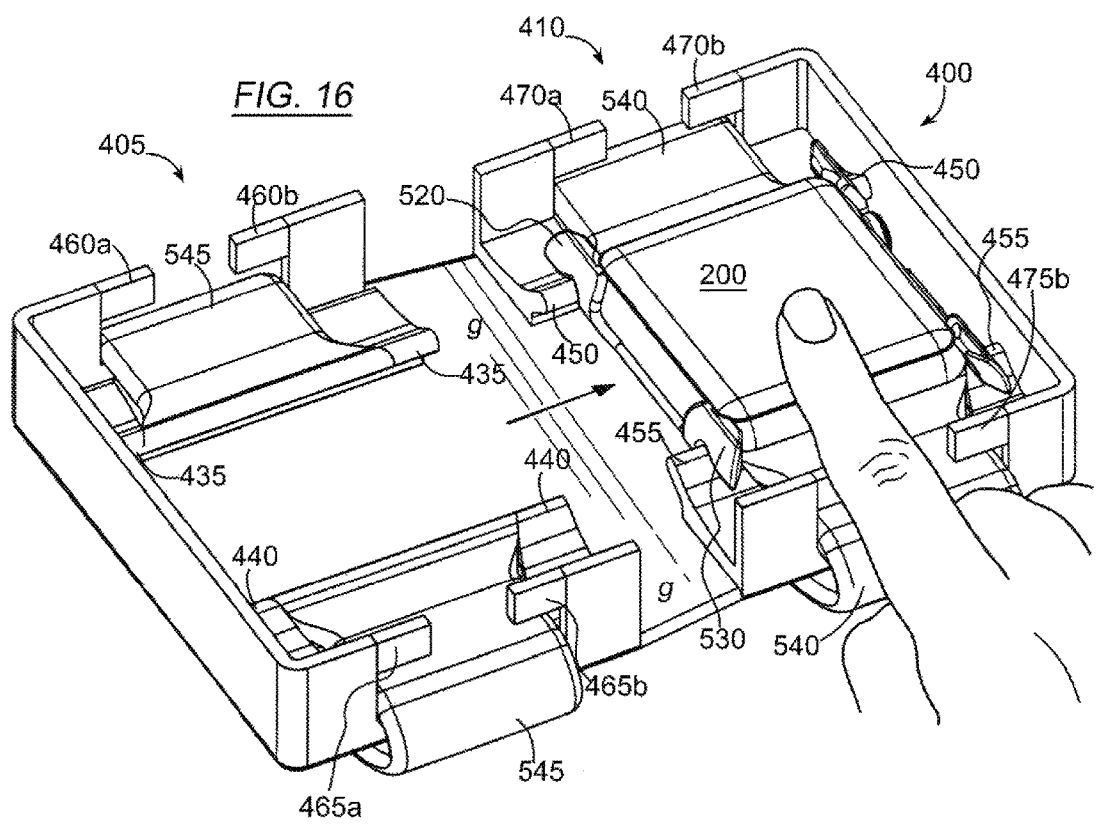
FIG. 16 shows a perspective view of the band changing station as a wearable computer finishes the process of changing bands according to the second embodiment of this invention.

FIG. 14 shows first band holding module 405 retaining a second band 545 of a wearable computer with band clamps 460*a* and 460*b*, and band clamps 465*a* and 465*b* disposed in a band retaining position, and mounting piece 425 cradling a computing member 550 of a wearable computer. Adjacent to the first band holding module 405, the second band holding module 410 retains the first band 540 of a wearable computer in a position that allows the first band 540 to receive the computing member 550 when it is slidably transferred from the first band holding module 405 to the second band holding module 410 as depicted transitionally in FIGS. 15 and 16.

Figure 17:
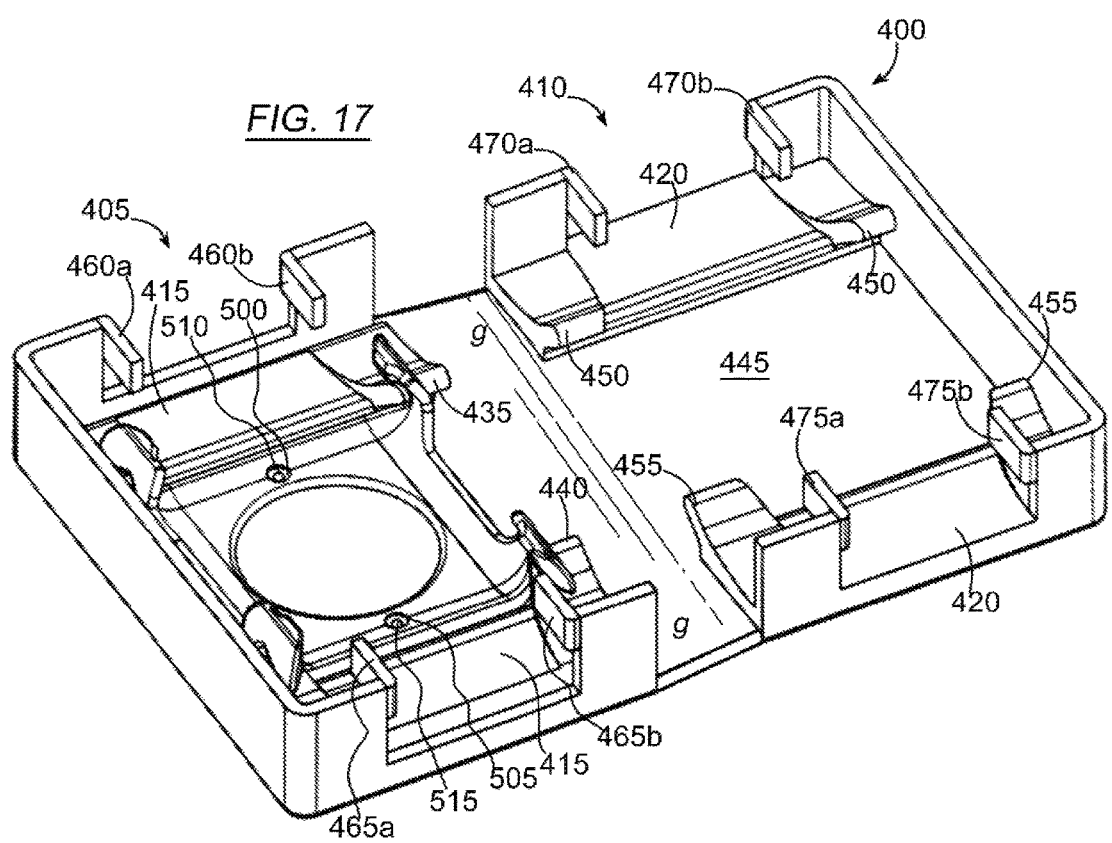
FIG. 17 shows a perspective view of the band changing station without bands according to a second embodiment of this invention.

FIG. 17 shows the first band holding module 405 and the second band holding module 410 without the retained bands of a wearable computer, and with the mounting piece 425 resting atop the first band holding module 405. The case 400 is adapted to be folded and is shown in its folded position in FIG. 18. The ability to fold the case 400 makes this embodiment more portable such that it could be conveniently carried in luggage, in a purse, in a pocket, or in a person's hand.

The case 400 shown in FIGS. 13-18 which surrounds the first and second band holding modules is merely exemplary, and other cases or containers will suggest themselves to those having skill in the art and access to this disclosure.

Another case configuration may be employed as long as it adequately aligns the first and second band holders such that mounting piece 425 may be transitioned from one band holding module to the next. In the particular embodiment depicted, a gap, designated (g), is shown between the first and second band holders. The gap may vary in width. In some embodiments, the gap may be proportionally as shown, while in other embodiments, there may be no discernible gap between the first and second band holders. In some embodiments; see (FIG. 17*a*), a bridging portion (bp) having a similar profile to edges 435 and 440, or edges 450 and 455 may be inserted to span the gap, or, the bridging portion may be extendable from any of the edges 435, 440, 450 or 455. While the particular embodiment shown folds shut as shown in FIG. 18, in various embodiments, the case may not fold shut, and instead employ other closure means such as a lid.

Method

A method of transferring a wearable computer from a first band to a second band comprises the steps of (1) pushing the computer against at least one fixed prong to release at least a first connector of the first band from the computer, or to release at least the computer from the first connector of the first band; (2) sliding the computer away from the first band's connector(s) and toward the second band's connector(s); and sliding the computer into connection with at least the first connector of the second band, or sliding at least the first connector of the second band into connection with the computer; and (3) continuing the sliding of the computer or at least the first connector of the second band until at least the first connector and the computer are locked together.

An alternative embodiment of the second embodiment may eliminate the mounting piece 425 as shown in (FIG. 17*a*). Prongs 510 and 515 could be disposed on the case 400, and only the body of the computer is transitioned from one band to another wherein grooves 260 track along and across edges 435, 450, 440, and 455 and along, across and over the attachment bar 320 of a band 300. To compensate for the lack of the funnel-guiding feature of the mounting piece 425, the rail edges 435, 440, 450, and 455 can be shaped like pencil tips to perform the guiding.

Prior Art

A standard Apple Watch is shown in prior art FIGS. 19 to 23. FIG. 19 shows an Apple Watch 200 without any band attached to it and having its face up. On the side of the Watch, there is a control button 280 and a control wheel 285. At the top and bottom ends of the Watch, are first and second grooves 260 in the body of the Watch.

FIG. 20 shows the back side of the Watch with its sensor means 270 in view. Groove 260 in the body of the Watch is seen at the bottom of the Watch. Near the top end and bottom end of the back side of the Watch, there is a release button 250. The release buttons 250 are spring-loaded and, when depressed, will unlock an attachment bar that might be disposed in a groove 260.

FIG. 21 shows one side view of the Watch. The top and bottom grooves 260 are clearly shown in these views. It is into these grooves that separate attachment bars coupled to a band can be slid and locked into place, thereby attaching the two ends of the band to the Watch.

FIG. 22 shows an isometric view of the Watch with a typical band attached to the Watch. This particular band is one that is comprised of two segments that can be coupled by means of a buckle. There are many different types of bands, some unitary and some non-unitary, that could be substituted for this particular band, as will be apparent to a person of ordinary skill in this art.

FIG. 23 shows an exploded view of the Watch and a band showing the relationship of the band attachment bars 320 to the groves 260. Attachment bars 320 located at band 300 ends slidably couple with grooves 260 and are formed and adapted to fit snugly into the grooves 260. Each attachment bar can have one or more loops 325 integral with the bar, or connected to it. Attachment bars 320 are preferably made of a suitable metal, but other materials could be used to make the attachment bars. Each attachment bar 320 can have a spring-loaded cam 350 that extends from one surface of the attachment bar.

It should be understood that the drawings and detailed description herein are to be regarded in an illustrative rather than a restrictive manner, and are not intended to be limiting to the particular forms and examples disclosed. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

I claim:

1. An apparatus comprising:
    a band changing station adapted to receive at least one watch-body and at least one watch-band, the band changing station including:
    one or more prongs adapted to engage with at least one band release member of the at least one watch-body;
    a first track member and a second track member, portions of each track member include a longitudinal support for a watch band and are adapted to fit into at least one recess of the watch-body when the at least one watch-band is uncoupled from the watch-body by the at least one release member of the watch-body, and, other portions of each track member include a detent for retaining in position the least one watch-band relative to the at least one watch-body permitting the at least one watch-body to transition in an out of alignment with the at least one watch-band by sliding movement on the first and second track members; and, the first and second track members are configured to support portions of the watch-body during side-to-side translation in a direction orthogonal to each longitudinal support, the watch-body movable from the first track member to the second track member.

2. The apparatus according to claim 1 further comprising at least one clamping member for securing the at least one watch-band in a desired position.

3. The apparatus according to claim 1, the one or more prongs further comprising at least one prong disposed on the band-changing station such that the prong is disposed adjacent to the at least one release member on the watch-body when the watch-body is placed upon the band changing station.

4. The apparatus according to claim 1 wherein portions of the first and second track members are adapted to align with an attachment bar of the at least one watch-band.

* * * * *